United States Patent
Gordon et al.

(10) Patent No.: US 10,832,673 B2
(45) Date of Patent: Nov. 10, 2020

(54) SMART SPEAKER DEVICE WITH COGNITIVE SOUND ANALYSIS AND RESPONSE

(71) Applicant: International Business Machines Corporation, Armonk, NY (US)

(72) Inventors: Michael S. Gordon, Yorktown Heights, NY (US); James Kozloski, New Fairfield, CT (US); Ashish Kundu, Elmsford, NY (US); Clifford A. Pickover, Yorktown Heights, NY (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 16/034,488

(22) Filed: Jul. 13, 2018

(65) Prior Publication Data

US 2020/0020329 A1 Jan. 16, 2020

(51) Int. Cl.
*G10L 15/22* (2006.01)
*G10L 15/08* (2006.01)
(Continued)

(52) U.S. Cl.
CPC .......... *G10L 15/22* (2013.01); *G06F 3/165* (2013.01); *G06F 3/167* (2013.01);
(Continued)

(58) Field of Classification Search
CPC ..... G10L 15/063; G10L 15/20; G10L 15/285; G10L 15/30; G10L 17/04; G10L 17/20;
(Continued)

(56) References Cited

U.S. PATENT DOCUMENTS

| 4,208,735 A | 6/1980 | Suzuki et al. |
| 7,383,174 B2 | 6/2008 | Paulin |

(Continued)

FOREIGN PATENT DOCUMENTS

| EP | 0982578 A2 | 3/2000 |
| WO | WO 00/13393 | 3/2000 |

(Continued)

OTHER PUBLICATIONS

List of IBM Patents or Patent Applications Treated as Related (Appendix P), May 6, 2020, 2 pages.
(Continued)

*Primary Examiner* — Martin Lerner
(74) *Attorney, Agent, or Firm* — Stephen J. Walder, Jr.; Feb R. Cabrasawan

(57) ABSTRACT

Smart speaker mechanisms are provided for processing audio sample data captured by the audio capture device is provided. The mechanisms capture one or more audio samples from a monitored environment and store the captured one or more audio samples in the audio sample buffer. The one or more captured audio samples are analyzed to determine whether the one or more captured audio samples represent a potential wake sound for initiating a responsive action by the smart speaker device. The potential wake sound is a variable sound determined to not be a normal ambient sound of the monitored environment. In response to determining that the one or more captured audio samples represent a potential wake sound for initiating a responsive action by the smart speaker device, the mechanisms initiate performance of the responsive action by the smart speaker device.

20 Claims, 6 Drawing Sheets

(51) Int. Cl.
*G10L 25/51* (2013.01)
*G06F 3/16* (2006.01)
*G06F 21/62* (2013.01)
*H04L 29/06* (2006.01)
*G10L 15/06* (2013.01)
*H04W 12/02* (2009.01)

(52) U.S. Cl.
CPC .......... *G06F 21/6245* (2013.01); *G10L 15/08* (2013.01); *G10L 25/51* (2013.01); *H04L 63/0245* (2013.01); *G10L 2015/088* (2013.01); *G10L 2015/223* (2013.01); *G10L 2015/228* (2013.01)

(58) Field of Classification Search
CPC ......... G10L 17/26; G10L 15/06; G10L 15/22; H04W 12/02
USPC ........ 704/231, 232, 233, 270, 273, 243, 251
See application file for complete search history.

(56) References Cited

U.S. PATENT DOCUMENTS

| | | | |
|---|---|---|---|
| 7,752,047 B2* | 7/2010 | Morris | G10L 15/26 704/251 |
| 8,275,829 B2 | 9/2012 | Plamondon | |
| 9,143,571 B2 | 9/2015 | Kim et al. | |
| 9,526,458 B2 | 12/2016 | MacAuslan | |
| 9,619,200 B2 | 4/2017 | Chakladar et al. | |
| 9,710,460 B2 | 7/2017 | Brown et al. | |
| 10,002,259 B1 | 6/2018 | Mai | |
| 10,332,517 B1 | 6/2019 | Wang | |
| 2007/0183604 A1* | 8/2007 | Araki | G10L 17/26 381/58 |
| 2008/0077408 A1 | 3/2008 | Wang et al. | |
| 2008/0278007 A1* | 11/2008 | Moore | G10L 15/26 307/116 |
| 2014/0046878 A1 | 2/2014 | Lecomte et al. | |
| 2014/0108013 A1 | 4/2014 | Di Cristo et al. | |
| 2014/0133663 A1 | 5/2014 | Grokop | |
| 2014/0164532 A1* | 6/2014 | Lynch | H04L 12/1818 709/206 |
| 2014/0214532 A1 | 7/2014 | Barton et al. | |
| 2015/0112678 A1 | 4/2015 | Binks et al. | |
| 2015/0221321 A1 | 8/2015 | Christian | |
| 2016/0335488 A1 | 11/2016 | Nongpiur et al. | |
| 2017/0103776 A1 | 4/2017 | Kim et al. | |
| 2017/0154638 A1* | 6/2017 | Hwang | G10L 25/51 |
| 2017/0220816 A1* | 8/2017 | Matusek | G06F 21/6245 |
| 2017/0262431 A1* | 9/2017 | Alam | G06F 40/30 |
| 2017/0263266 A1* | 9/2017 | Henrique Barbosa Postal | G10L 25/51 |
| 2018/0081873 A1* | 3/2018 | Carmena | G06F 40/253 |
| 2018/0108369 A1 | 4/2018 | Gross | |
| 2019/0043525 A1 | 2/2019 | Huang et al. | |
| 2019/0051288 A1* | 2/2019 | Lee | G10L 15/06 |
| 2019/0066686 A1* | 2/2019 | Baracaldo Angel | G10L 15/08 |
| 2019/0087153 A1* | 3/2019 | Savolainen | G10L 17/26 |
| 2019/0114672 A1* | 4/2019 | Jacobs | G06F 8/20 |
| 2019/0129941 A2* | 5/2019 | Ben-Kiki | G06F 40/30 |
| 2019/0180735 A1* | 6/2019 | McElhaney | G10L 15/265 |
| 2019/0259378 A1 | 8/2019 | Khadloya et al. | |
| 2019/0279615 A1* | 9/2019 | Ben-Dor | G10L 15/00 |
| 2019/0325067 A1* | 10/2019 | Vaughn | G10L 15/26 |
| 2019/0377898 A1 | 12/2019 | Dunjic et al. | |
| 2020/0020328 A1* | 1/2020 | Gordon | G10L 15/22 |
| 2020/0134211 A1* | 4/2020 | Miller | H04W 12/02 |

FOREIGN PATENT DOCUMENTS

| | | |
|---|---|---|
| WO | WO 02/077898 A2 | 10/2002 |
| WO | WO 2007/023021 A3 | 3/2007 |
| WO | WO 20131142908 A1 | 10/2013 |

OTHER PUBLICATIONS

Bell, Karissa et al., "Amazon teaches Alex to recognize the sound of your voice, report says", Mashable, http://mashable.com/2017/02/27/amazon-echo-alexa-voice-recognition/#AFK1gBLpSqqC, Feb. 27, 2017, 5 pages.

Gebhart, Andrew, "Google Home vs. Amazon Echo, round 2: Google strikes back", CNET, https://www.cnet.com/news/google-home-vs-amazon-echo/, May 18, 2017, 8 pages.

Houghton, Lesley A. et al., "Editorial: Breaking the Sound Barrier? Pitfalls and Benefits of Acoustic Cough Monitoring", The American Journal of Gastroenterology 108, 1833-1836, Dec. 2012, Abstract, 2 pages.

Jesdanun, Anick, "How Amazon Echo listens and what it stores", Science X, https://phys.org/news/2016-12-amazon-echo.html#jCp, Dec. 29, 2016, 4 pages.

* cited by examiner

SMART SPEAKER DEVICE WITH COGNITIVE SOUND ANALYSIS AND RESPONSE

BACKGROUND

The present application relates generally to an improved data processing apparatus and method and more specifically to mechanisms for providing a smart speaker device with cognitive sound analysis and response.

Smart speaker technology has increased in capabilities and popularity over recent years. A smart speaker is a type of wireless speaker and smart device that utilizes Wi-Fi, Bluetooth or other communication standards, and provides features beyond audio playback. This can include features such as compatibility across a number of services and platforms, peer-to-peer connection through mesh networking, intelligent personal assistants, and the like. Each can have its own designated interface and features in-house, usually launched or controlled via an application or home automation software. Examples of smart speakers include Amazon Echo™, Google Home™, Apple Siri™ enable devices, Microsoft Cortana™ enabled devices, and the like.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a smart speaker device comprising an audio capture device and an audio sample buffer, for processing audio sample data captured by the audio capture device is provided. The method comprises capturing, by the audio capture device, one or more audio samples from a monitored environment and storing, by the smart speaker device, the captured one or more audio samples in the audio sample buffer. The audio sample buffer stores an amount of captured audio samples corresponding to a specified time window for detecting events occurring within the monitored environment. The method further comprises analyzing, by smart speaker device logic of the smart speaker device, the one or more captured audio samples to determine whether the one or more captured audio samples represent a potential wake sound for initiating a responsive action by the smart speaker device, wherein the potential wake sound is a variable sound determined to not be a normal ambient sound of the monitored environment. Moreover, the method comprises, in response to determining that the one or more captured audio samples represent a potential wake sound for initiating a responsive action by the smart speaker device, initiating performance of the responsive action by the smart speaker device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
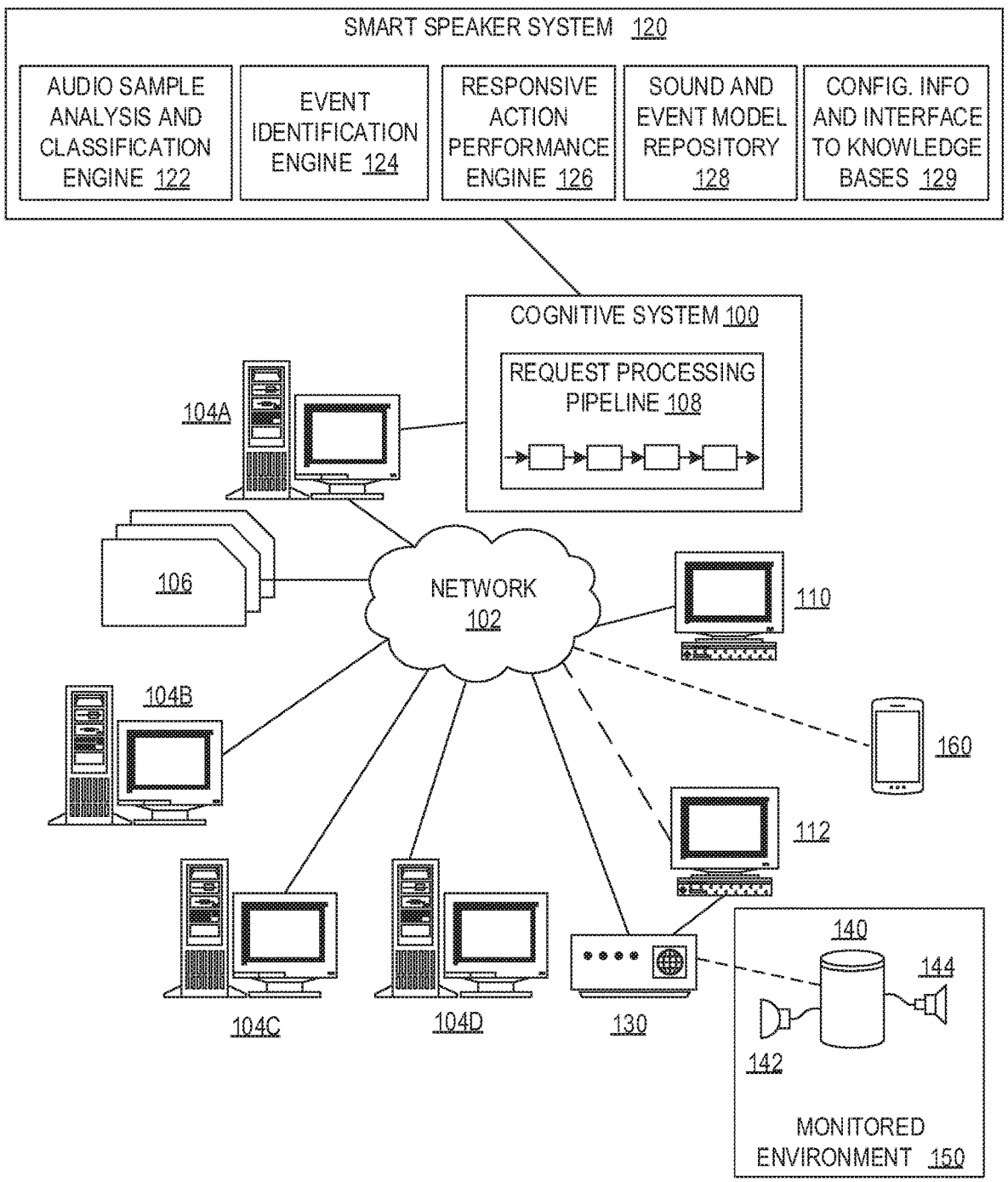
FIG. 1 depicts a schematic diagram of one illustrative embodiment of a smart speaker system in accordance with one illustrative embodiment.

The illustrative embodiments comprise mechanisms for providing a smart speaker system with cognitive sound analysis and response. As mentioned above, smart speaker technology has recently enjoyed increase popularity with the release of various smart speaker devices and services that make home automation and audio entertainment more accessible and user friendly. According to the current trends, these smart speaker devices will play more dominant roles in smart homes in the future. A defining characteristic of these known smart speaker devices is the need to have a fixed predefined wake word or phrase that the smart speaker must recognize in order to determine that it is to perform speech recognition on the spoken words of the user following the wake word or phrase. Examples of such fixed wake words or phrases include, for example, "Hey, Siri . . . " for the Apple Siri™ devices, "Cortana . . . " for the Microsoft Cortana devices, or "Alexa . . . " for the Amazon Echo™ devices. Known smart speakers do not autonomously recognize different types of sounds as wake sounds and do not provide any functionality for analyzing various sounds to categorize them, determine patterns of sounds, cognitively analyze such patterns to identify events occurring within a monitored environment, and automatically cognitively determine appropriate feedback or response actions to be performed in response to identification of such events.

The present invention provides a smart speaker system that is capable of analyzing a variable wake sound which activates the smart speaker system's functionality for cognitively, and automatically, analyzing the sound, identifying or classifying the sound as a particular type of sound originating from a particular type of sound source, analyzing the pattern of sounds occurring within a designated time window of each other to identify a potential event, and determining an appropriate responsive action to perform in response to the identification of the potential event. The analysis of the pattern of sounds may take into account a plurality of different information obtained from analysis of the sounds and patterns of sounds themselves, as well as other knowledge databases and information sources that may be generalized for any monitored environment, specific to the particular environment being monitored by the specific smart speaker device and system, or even specific to the particular user or operator of the smart speaker device.

For example, the smart speaker system may recognize any sound that is significantly different from ambient sounds learned to be present at particular times of day for the particular monitored environment in which the smart speaker system's audio receivers are present. These sounds may take many different forms depending on the particular implementation and may include, for example, sounds of a dog barking, loud noises, coughs, calls for help, fire alarms, carbon monoxide alarms, machine making an improper noise (e.g., due to a defect, incident, or worn part), the speaking of a code/token such as a prime number or emergency word/phrase (e.g., as a user security signal or the like), whistling, the sound of someone falling to the floor, pest noises (e.g., mice, bees) in a wall of the environment, a car accident, baby or child crying, glass breaking, doorbells, or any other distinguishable sound that may indicate something occurring within the monitored environment, other than a normal ambient sound situation, that is of importance for performing a responsive action. A registry or database of sound patterns, sound features, or the like, and their corresponding sound types and source types, also referred to herein as a sound sample archive, may be provided for use in classifying detected sounds into a corresponding type of sound from a particular type of sound source. In addition, a registry of sound patterns, which may include correlations of sounds, sequences of sounds, or other patterns of identified sounds indicative of events occurring within a monitored environment may also be provided for use in determining whether a corresponding event is or has occurred within the monitored environment.

The illustrative embodiments may comprise one or more microphones or other audio capture devices, either present in a single smart speaker device, multiple smart speaker devices, or other distributed array of audio capture devices, within or associated with a monitored environment. In some embodiments, the audio capture devices may be part of a smart speaker device that is mobile within a monitored environment, such as part of a robotic chassis whose movement is either automatically guided through the monitored environment or controlled remotely by a human operator. The audio capture devices operate to capture audio data, e.g., data representing the waveform of sound captured from a monitored environment. The audio data may then be locally and/or remotely stored and analyzed to identify the sounds and source of the sounds present in the audio data. For example, the analysis of the audio data may comprise first determining, such as at a local level, whether the captured audio data represents one or more sounds that may be significant for additional analysis, i.e. sounds that are distinct from learned ambient sounds of the monitored environment and which pass an initial set of criteria, which may be user configurable, indicating a need for further analysis.

Thereafter, a more cognitive and detailed analysis of audio data comprising sounds determined to be significant may be performed either locally or remotely, e.g., at a remote server or other computing device. For example, such analysis may comprise performing pattern analysis, feature extraction (e.g., amplitude, frequency, duration, etc.), comparisons to known sounds or sound patterns, and the like. The patterns and/or features may be used as a basis for comparing the audio data, i.e. the sound sample, with a stored archive of sound samples, i.e. a sound sample archive, to thereby indicate a nature or type of the sounds in the audio data and/or the nature or type of the sound sources generating the sounds in the audio data. Pattern analysis may be applied to compare the sound sample patterns to determine a degree of matching of the captured sound sample to archived sound samples. Similarly, feature comparisons may be used to determine a degree of matching between features of the captured sound samples with archived sound samples. In this way, the identification or classification of a captured sound sample may be generated with regard to archived sound samples that have a highest degree of matching or confidence in the matching.

In some implementations, the audio capture device(s) are able to triangulate or otherwise identify the location within the monitored environment from which the sound is sampled and may track movement of sound sources within the monitored environment, e.g., tracking amplitude and timing of received audio data from one or more audio capture devices indicating movement towards or away from the respective audio capture devices. Such location and/or movement information may be used to assist with cognitive analysis of the audio data to identify the classification or identification of the sound. Such location and/or movement detection may be based on sound amplitudes received at various audio capture devices positioned in different positions of the monitored environment, e.g., the same sound received at different audio capture devices with different amplitudes indicates the source being closer to audio capture devices where the amplitude is relatively greater and further away from audio capture devices with the amplitude is relatively lower.

In some illustrative embodiments, sentiment analysis may be performed on captured audio data to determine moods, intents, or the like, of the sources of the audio data, i.e the captured sounds from the monitored environment. For example, natural language content of the audio data, as may be determined using a speech to text conversion mechanism or the like, may be analyzed to identify particular terms and phrases indicative of moods, intents, and the like. Moreover, various audio characteristics, or features, may be evaluated for sentiment such as rising pitch, sharp increases in amplitude of the captured audio, audio data patterns indicative of crying, moaning, screaming, and the like, etc. This sentiment analysis may be combined with other types of analysis, such as identification of sound type, sound source type, location, and the like, in a joint analysis directed to identifying events occurring within or in association with a monitored environment, as described hereafter.

Various types of analysis may be performed on the captured audio data to perform sound identification in a composite sound signal. For example, impulsive sound components in a composite sound signal may be separated using wavelet analysis and sorting of wavelet coefficient sets according to statistical parameters of each respective coefficient set, such as is generally known in the art. Each entire coefficient set is either included or excluded from each respective separated component based on the statistical parameters. Once the impulsive sound component is isolated, it may be compared to reference sound information, e.g., stored or archived sound patterns, in order to classify the sound according to its potential causes.

In some embodiments, a history of captured audio data, and the sound identification results associated with the captured audio data, e.g., the identification of the type of sound and the type of sound source of the sound, may be stored for use in cognitively evaluating the pattern of different identified sounds to determine whether an event is occurring within the monitored environment that would trigger a responsive action, or reaction, by the smart speaker system, e.g., the outputting of an audible message, the outputting of an audible request or question to a user and listening, via the smart speaker device, for an audible response from a user which is then processed, the triggering of a display of information such as on a display associated with the smart speaker device, the triggering of a visual indicator on the smart speaker device, such as a light on the smart speaker device, the initiating of a communication (automated telephone call, electronic mail message, instant text message, or the like) to another device via a wired or wireless connection, or the like. The history may be stored in a local buffer memory of the smart speaker device, stored remotely in a remote storage device of a computing system in association with an identifier of the smart speaker device, or the like. The history preferably is configured to store captured audio data and the corresponding identification of sounds present in the audio data as determined from the smart speaker system, identified sound source types, and any other suitable features of the captured sounds, for a predetermined time window, or period of time, consistent with an amount of time required to identify events occurring within or in association with the monitored environment. For example, the time window may be set to store audio data captured over a 5, 10, or 15 minute time duration, or any other desirable amount of time, such that patterns and correlations of sounds present in the audio data captured during the time window may be made to identify events occurring within or associated with the monitored environment.

In the above example embodiment, the time window is relatively short and associated with a time period determined to be sufficient to identify events occurring within or associated with the monitored environment. However, in some illustrative embodiments, the history may be maintained in the smart speaker system in a more permanent fashion for use in later playback operations. For example, the buffered audio data and corresponding sound identifications may be moved from the buffer memory to a more permanent memory, e.g., a hard disk storage system, remote storage system, or the like, for later retrieval and playback when desired. Moreover, such a stored history may be made accessible to a user via another remotely located computing device, e.g., a user may be notified, via an electronic communication (e.g., email, instant message, or the like) of an event occurring and be given a link or other selectable mechanism by which to access the stored audio data and sound identification information from the permanent storage.

The cognitive analysis of the identified sound(s) in the captured audio data over the specified time window may involve utilizing stored or learned knowledge about events and the types of sounds associated with such events. This stored or learned knowledge may be provided in the form of machine executable rules that are stored in the smart speaker system, either in the local smart speaker device, in a remotely located computing system (e.g., a cloud computing system), or a combination of both local and remotely located devices/systems. The rules may be stored as template data structures, where each template data structure may represent a different type of event and may comprise one or more rules.

In determining whether an event is occurring within or in association with the monitored environment, a degree of matching of the sounds found in the captured audio data to the criteria specified in these rules/templates may be calculated to determine a risk or danger level of the perceived event associated with the monitored environment. For example, the risk or danger level may be a combination of a basic or default risk or danger level associated with the event defined by the rule/template, weighted by the degree of matching of the sounds, or patterns of sounds, identified in the captured audio for the specified time window. For example, a template may have one or more rules specifying criteria for an event of a "break-in" at the monitored environment. The rules may specify the sounds as including glass breakage, security alarm sounds, crunching glass, sounds of footsteps of unknown frequency or duration, shuffling of contents of a room, etc. Based on how many of these sounds are identified in the captured audio data during the specified time window, a degree of matching may be calculated and used to weight the basic or default risk/danger level of the event, e.g., the default risk/danger level may be considered high, but if the number of matching sounds is low, then the risk/danger level may be reduced accordingly. Alternatively, the degree of matching may simply be used as a measure of confidence that the event is actually occurring or has occurred in association with the monitored environment and if the confidence is sufficiently high, e.g., equal to or greater than a predetermined threshold, which may be user configurable, then the event specified in the rules/template is considered to be a match and the corresponding risk/danger level for that event is utilized.

Based on the type of event, source of the sounds identified in the captured audio data, and the risk/danger level associated with the event, a corresponding responsive action may be taken by the smart speaker system. The responsive actions may take many different forms depending on the particular type of event. However, these responsive actions may generally be categorized into local audible/visual message/request output actions, remote communication actions, and local device control actions. Of course, a combination of such actions may also be utilized. Examples of local audible/visual message/request output actions include, but are not limited to, outputting a natural language message in an audible format indicating the nature of a detected event, outputting a natural language request in an audible format indicating a nature of the detected event and requesting instructions from a user (followed by appropriate action based on the user response), illuminating or otherwise controlling the turning on/off of a visual indicator as well as controlling characteristics of the visual indicator, e.g., color, textual message displayed, blinking, rate of blinking, or other visual characteristics, and the like. Examples of remote communication actions include, but are not limited to, initiating an automated telephone call to a user's registered telephone number, initiating a call to a security company managing the security of the monitored environment, initiating a call to emergency services personnel, sending an electronic mail message to a user associated with the smart speaker system indicating the detected event with/without attachment of audio data for playback, sending an instant message to a registered device associated with a user, or the like. Examples of local device control actions include, but are not limited to, turning on/off lights, activating/deactivating security alarms, locking/unlocking doors, turning on/off video feeds from security video cameras, controlling the viewing position of such security video cameras, e.g., by controlling a motor in the video camera to pan the camera to focus on a location where the smart speaker system determines the source of a detected sound may be present, playing music, sounding alarms, or other audio, or the like.

Thus, based on the type of event, source of the sounds identified in the captured audio data, and the risk/danger level associated with the event, one or more corresponding responsive actions are identified by a cognitive system of the smart speaker system and a runtime action composer component composes the corresponding responsive actions and causes the responsive actions to be performed. This may involve accessing registered contact information for the user, such as may be stored in configuration information or a user profile data structure, to obtain information for sending communications and what those communications should contain. This may further involve accessing other knowledge bases located remotely to obtain information needed to formulate the content and/or control information for composing and/or directing the responsive actions, e.g., unique identifiers of devices to be controlled, identifiers of on-line retailers from which products/services may be obtained, and the like.

The operation of the smart speaker system is user configurable in many different ways so that the user can identify the types of events for which the smart speaker is to monitor the environment, the level of confidence and/or danger/risk level required for different types of responsive actions to be performed, the types of responsive actions to be performed in response to particular types of events, schedules of when certain types of events are to be monitored for, schedules of when the smart speaker system is to disable monitoring, such as for privacy or security reasons, and the like. Moreover, the smart speaker system may learn, over time, normal ambient sound patterns for the monitored environment such that these normal ambient sound patterns may be filtered from other captured sound data when evaluating whether or not significant sounds are present in captured audio data requiring further analysis.

Thus, the present invention provides a cognitive smart speaker device and smart speaker system that operates based on a variable wake sound. The mechanisms of the illustrative embodiments identify the type of the sounds captured in the monitored environment and the types of the sources of the sounds, through cognitive analysis of patterns and features of the captured sounds in comparison to archived sound sample information. Moreover, the mechanisms of the illustrative embodiments may utilize joint analysis when performing such cognitive analysis, using a plurality of different sound attributes and information obtained from other knowledge databases and information sources, to identify the type of sounds captured and the types of sources of such sounds. Furthermore, the mechanisms of the illustrative embodiments may evaluate patterns of identified sounds to identify events occurring within or associated with a monitored environment and may take appropriate responsive action in response to identifying an event.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides a smart speaker system that is capable of analyzing a variable wake sound which activates the smart speaker system's functionality for cognitively, and automatically, analyzing the sound, identifying or classifying the sound as a particular type of sound originating from a particular type of sound source, analyzing the pattern of sounds occurring within a designated time window of each other to identify a potential event, and determining an appropriate responsive action to perform in response to the identification of the potential event. The smart speaker system may be completely provided within a stand alone smart speaker device or may be distributed over multiple devices that may communicate via one or more data networks. For example, a smart speaker device may be provided that includes software logic for implementing the various components of a smart speaker system in accordance with the illustrative embodiments. Such a stand-alone smart speaker system may access remotely located data processing systems for information retrieval purposes, but otherwise the functionality of the illustrative embodiments may be provided within the stand alone smart speaker device. In other illustrative embodiments, the smart speaker system may comprise a smart speaker device that performs a first subset of the functionality described herein with regard to various ones of the illustrative embodiments, while other subsets of the functionality may be provided by one or more other data processing systems, cloud based systems, or the like.

Figure 2:
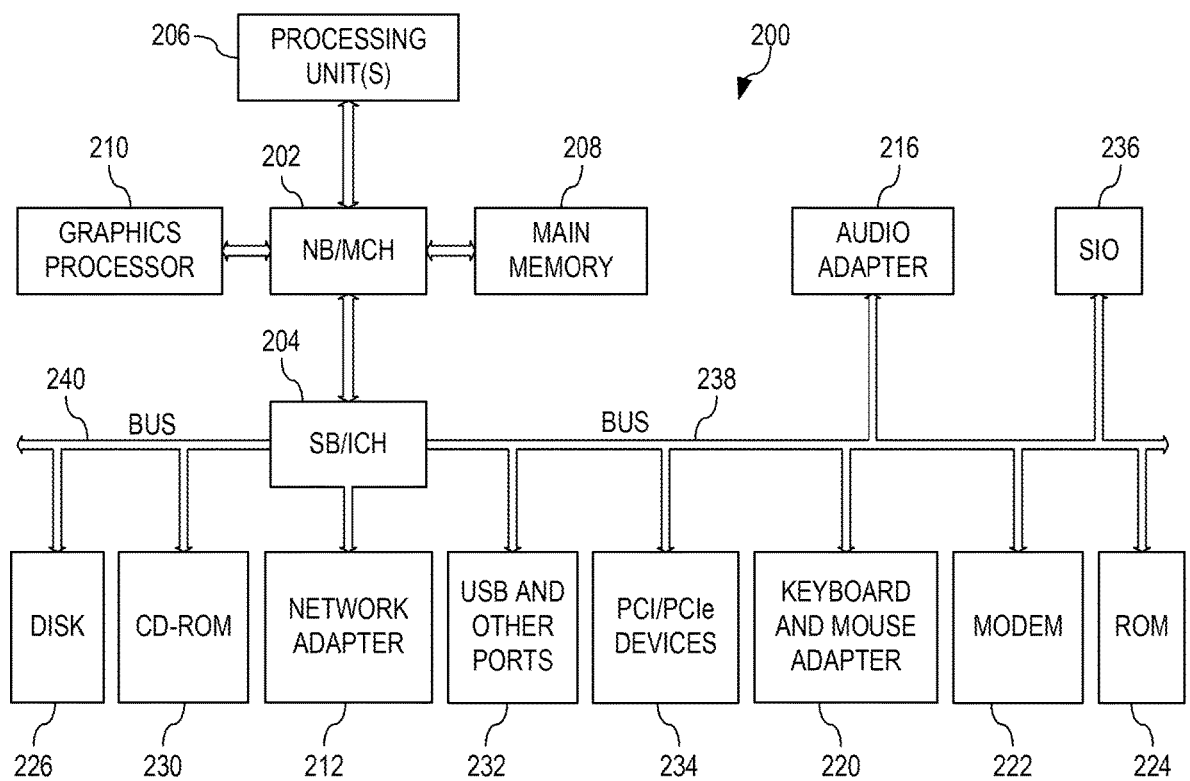
FIG. 2 is an example block diagram of a data processing system in which aspects of the illustrative embodiments may be implemented.
Figure 3:
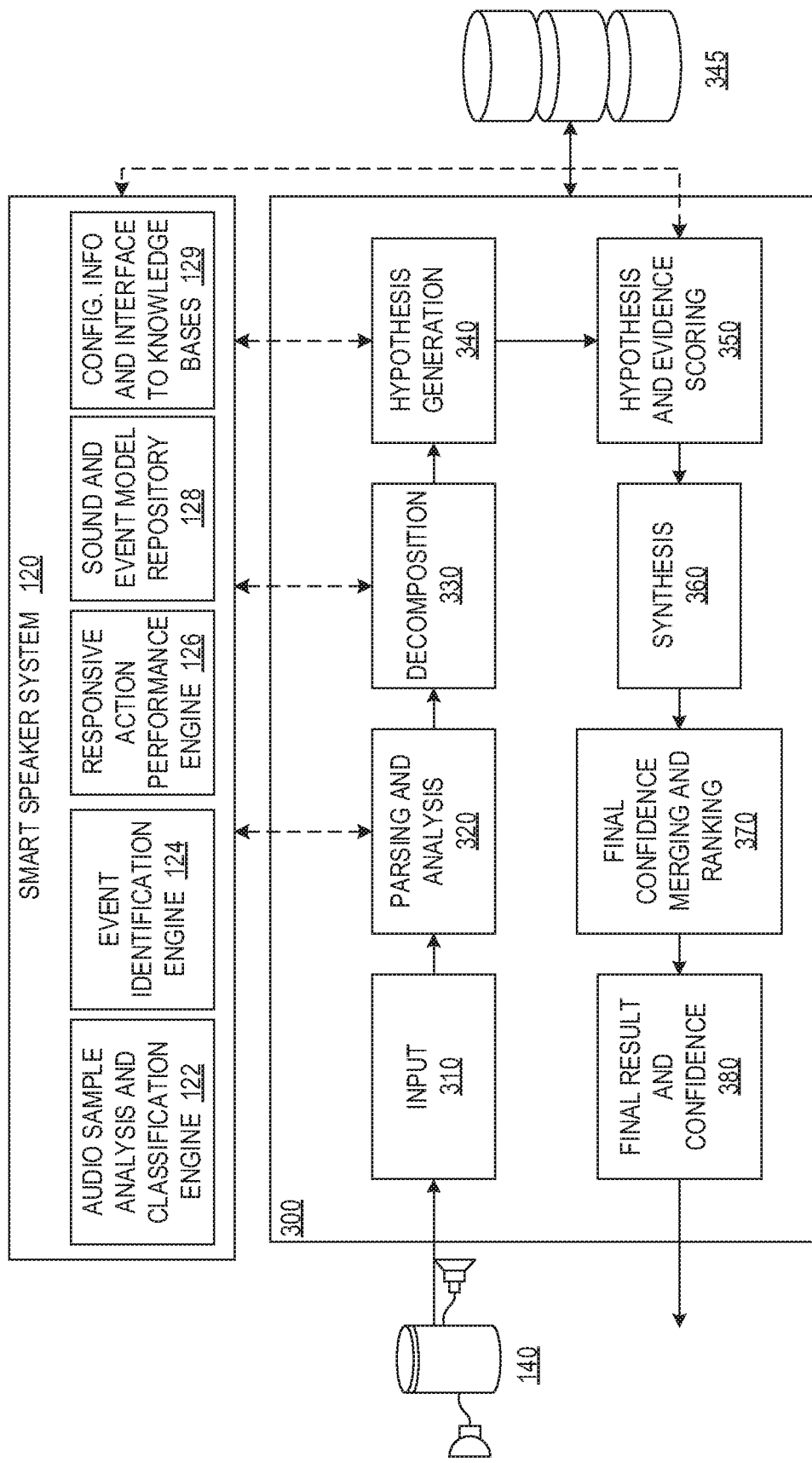
FIG. 3 is an example diagram illustrating the interaction and/or implementation of the smart speaker system in various stages of a cognitive system request processing pipeline in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing various aspects of an example smart speaker system comprising logic for performing variable wake sound activation and cognitive sound recognition, event detection, and responsive action performance in accordance with one illustrative embodiment. The example shown in FIGS. 1-3 assumes a distributed data processing system environment for purposes of illustration. Moreover, the example shown in FIGS. 1-3 utilizes a cognitive system for performing variable wake sound recognition, event identification, and responsive action performance. The cognitive system implements a request processing pipeline, request processing methodology, and request processing computer program product with which the mechanisms of the illustrative embodiments may be implemented. These requests may be provided as structure or unstructured data, request messages, natural language questions, or any other suitable format for requesting an operation to be performed by the cognitive system. For example, the request may be simply the detection of audio data by audio capture device(s) associated with a smart speaker device and the request being the input data provided for sound pattern/feature analysis and recognition, event identification, and responsive action performance. In other cases, the request may be a spoken question made by a user and captured by an audio capture device of the smart speaker system.

The request processing pipeline may have an associated corpus or corpora that is ingested by the cognitive system to perform cognitive operations on input requests and/or data. The corpus or corpora may comprise information from a variety of different sources which may be generalized for a plurality of different types of monitored environments, or may be specific to the particular monitored environment in which the smart speaker system is present, or specific to the particular user associated with the smart speaker system. For example, the corpus may comprise general sound pattern, sound features, and corresponding sound types and types of sound sources for various types of general sounds that may be found in a number of different environments, e.g., sounds of a dog barking, human coughs, calls for help, fire alarms, carbon monoxide alarms, machines making improper noises (e.g., due to a defect, incident, or worn part), the sound of someone falling to the floor, pest noises (e.g., mice, bees) in a wall of the environment, a car collision, baby or child crying, glass breaking, doorbells, or any other distinguishable sound that may indicate something occurring within the monitored environment, other than a normal ambient sound situation, that is of importance for performing a responsive action.

Moreover, the corpus may comprise configuration information for the particular monitored environment in which the smart speaker system or device is present. For example, the corpus may comprise configuration information indicating the type of the monitored environment, e.g., a home residence, office, school, commercial property, etc. which indicates a potential subset of audio samples that may be associated with that monitored environment. The configuration information may comprise a listing of the contents of the monitored environment, e.g., a television, refrigerator, dishwasher, vacuum cleaner, computer, stereo, telephone, washing machine and dryer, glass windows, doors, security alarms, fire alarms, carbon monoxide sensors, etc. In some cases, information about the user and/or other occupants of the monitored environment may also be registered in the configuration information including gender, age, and the like. Any configuration information that may be used to select subsets of audio sample information from the larger superset of generalized audio samples may be included without departing from the spirit and scope of the present invention. This allows for a multi-tiered matching or evaluation of captured audio samples by first looking to the subsets for matches and if no match is found then expanding the search to the larger superset of generalized audio samples, e.g., if the smart speaker system knows that an elderly person lives in the monitored environment, a subset of audio samples associated with elderly persons may be first searched to determine if there is a sufficient match and if not, then a search of a larger superset of generalized audio samples may be performed.

The corpus may also comprise specific sound patterns for the specific monitored environment. For example, during a training phase of operation, the audio capture devices of the smart speaker system may be used to capture audio samples over a training period of time from the specific monitored environment. These captured audio samples may be analyzed to extract audio features of the captured audio samples and may be presented to the user of the smart speaker system for classification, such as by recording the captured audio samples and replaying them to the user who may then answer questions that the smart speaker system presents to the user and captures the user's response via natural language processing.

For example, assume that during a training period, the audio capture devices capture the sound of an icemaker in a freezer dropping ice into the receptacle. The audio capture device may capture the audio sample and analyze it to extract representative audio features. The audio sample may be stored for later playback to the user when the user agrees to assist with training. The smart speaker system, via the smart speaker device, may playback the audio sample followed by a set of inquiries, such as "What is this sound?", "What is the source of this sound?", or the like. In response to each of these inquiries, the audio capture device of the smart speaker device may capture the user's spoken response and may then perform natural language processing of the spoken response to obtain the identification of the type of sound, i.e. ice dropping, and the type of sound source, i.e. freezer ice maker. This information may be stored, along with the extracted features and even the captured audio sample, in a monitored environment specific database or registry of sound samples specific to the monitored environment.

Similarly, the corpus or corpora may comprise personal information, audio sample information, and the like, that is specific to the particular user associated with the smart speaker system. For example, the audio capture device of the smart speaker system may capture and store an audio sample of the user's speaking of a code/token, such as a prime number or emergency word/phrase (e.g., as a user security signal or the like). The personal information provided in the corpus or corpora may also comprise information from other systems that the user may utilize, such as a computerized personal calendar, electronic mail system, communication device contact information database, or the like. The information provided from these various systems may be utilized to perform cognitive analysis of captured audio samples to determine whether events are occurring or have occurred, the risk or danger level of the events, and perform responsive actions if needed.

The smart speaker system, or the corpus/corpora, may further include knowledge, rules, or the like, defining events and responsive actions that the smart speaker system is to perform in response to such events. The knowledge or rules may specify sounds that occur relative to one another and which combined represent an event. The sounds may be defined as occurring in a sequence or a sequence may not be specified. That is, the event may be determined to have occurred or be occurring within or associated with the monitored environment only if a sufficient number of the sounds are detected in the captured audio samples for a particular period of time, and a specified sequence of sounds is determined to be present, or regardless of the sequence. Responsive actions may be dependent on the particular event and risk/danger level of the event. For example, if the event is a break-in event indicating an intruder has entered the monitored environment, the risk/danger level is considered high and the responsive action may be to initiate an automated call to the police or an emergency first responder communication system, e.g., 911 call. If the event is a series of coughs coming from a baby, the event may be considered to be potential croup and the user may be informed of this potential situation, such as via an audible message, an email or other textual message with an attachment of the stored audio sample, or the like, so that the user may perform a follow-up on the event detected by the smart speaker system. Moreover, such sounds of coughing or the like may be recorded, transmitted, and played back to a medical professional, e.g., physician, ER doctor, etc., for assisting the medical professional in treating the patient. Various types of responsive actions may be defined for implementation by the smart speaker system based on the particular corresponding event and may be stored in association with such knowledge or rules either in the smart speaker system itself, or in the corpus/corpora accessed by the smart speaker system.

One type of request processing pipeline with which the mechanisms of the illustrative embodiments may be utilized is a Question Answering (QA) pipeline. With such a QA pipeline, a user may provide an input question, such as via a spoken question that is captured by the audio capture devices of the smart speaker system, which is then parsed and analyzed to determine what the question is asking, and then perform a search of available information from one or more corpora to ascertain candidate responses to the input question, rank them according to evidential support, and then select a final response to be provided back to the user. It should be appreciated that while the present invention may include such a QA pipeline in the context of the cognitive system, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What was that sound?", the cognitive system may instead receive a request of "Identify that sound," or the like. It should be appreciated that the mechanisms of the QA system pipeline may operate on requests in a similar manner to that of input natural language questions with minor modifications. In fact, in some cases, a request may be converted from a statement to a natural language question for processing by the QA system pipelines if desired for the particular implementation. Moreover, the request or question may be simply implied by the providing of input data for processing. Thus, for example, the input "question" may in fact be captured audio sample(s) that are provided to the pipeline for processing with the implied request or question of classifying the sound(s) present in the audio sample(s) and determining if an event has occurred requiring a responsive action.

As the illustrative embodiments may employ a cognitive system pipeline to process input data and generate analysis results for identifying variable wake sounds, identify patterns of sounds, determine whether events are occurring or have occurred in association with a monitored environment, and determining an initiating responsive action, it is important to first have an understanding of how cognitive systems operate. It should be appreciated that the mechanisms described in FIGS. 1-3 are only examples and are not intended to state or imply any limitation with regard to the type of cognitive system mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like. In the context of the illustrative embodiments set forth herein, the logic of the cognitive system implements cognitive operations for autonomously recognizing different types of sounds as wake sounds, analyzing various sounds to categorize them, determine patterns of sounds, cognitively analyze such patterns to identify events occurring within a monitored environment, and automatically cognitively determine appropriate feedback or responsive actions to be performed in response to identification of such events.

IBM Watson™ is an example of a cognitive system which may be modified and augmented to perform the cognitive operations of the illustrative embodiments. The IBM Watson™ cognitive system can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems, or processing and responding to requests input to these cognitive systems, using a request processing pipeline to process requests which may or may not be posed as natural language questions or may be provided simply as input data for processing.

In accordance with the illustrative embodiments, the request processing pipeline is an artificial intelligence application executing on data processing hardware that processes input data, which may be captured audio data from a smart speaker device, for example, which may be provided itself or in combination with a natural language question posed by a user to the smart speaker device. The request processing pipeline receives inputs from various sources including input from other data processing systems over a network, one or more corpora of electronic documents, information from audio (sound) sample archives, knowledge information sources, or other data. Data storage devices or systems store the corpora of data and may be accessible via the data network(s). The data in the corpora may include any file, electronic textual document, article, or source of data for use in the cognitive system. In particular with the illustrative embodiments, the corpora includes one or more audio (sound) sample archives having sound pattern information, sound features, sound types, and sound source type information. Moreover, the corpora may include user specific information, monitored environment specific information, and other knowledge sources that provide information or data that may be utilized by the cognitive system to perform cognitive operations in accordance with one or more of the illustrative embodiments, as touched upon above and described in greater detail hereafter.

The request processing pipeline receives an input question or request, parses the question/request to extract the major features, uses the extracted features to formulate queries, and then applies those queries to the corpus of data. Based on the application of the queries to the corpus of data, the request processing pipeline generates a set of hypotheses, or candidate responses to the input question/request, by looking across the corpus of data for portions of the corpus of data that have some potential for containing a valuable response to the input question/request. The request processing pipeline then performs deep analysis on the content, features, and the like, of the input question/request, e.g., sound patterns and/or audio features extracted from one or more captured audio sample(s), as well as the content, features, and the like, used in each of the portions of the corpus of data found during the application of the queries using a variety of reasoning algorithms. There may be hundreds or even thousands of reasoning algorithms applied, each of which performs different analysis, e.g., comparisons, calculations and analysis, and the like, and generates a confidence score indicating a confidence in the candidate response being a correct response for the input question/request. For example, some reasoning algorithms may look at the matching of terms and synonyms within the language of the input question and the found portions of the corpus of data. Other reasoning algorithms may compare extracted features of captured audio samples with features of stored audio samples to determine degrees of matching and corresponding classifications of types of sounds and/or types of sound sources associated with captured audio samples. Other reasoning algorithms may look at temporal or spatial features associated with captured audio samples and calendar information for a particular user, or schedules of ambient sounds, while others may evaluate rules, patterns, or sequences associated with defined events and identify responsive actions to be performed.

The scores obtained from the various reasoning algorithms indicate the extent to which the potential response is inferred by the input question/request based on the specific area of focus of that reasoning algorithm. Each resulting score is then weighted against a statistical model. The statistical model captures how well the reasoning algorithm performed at establishing the inference between the input question/request and the candidate answer/response. The statistical model is used to summarize a level of confidence that the request processing pipeline has regarding the evidence that the potential response, i.e. candidate answer/ response, is inferred by the question/request. This process is repeated for each of the candidate answers/responses until the request processing pipeline identifies candidate answers/responses that surface as being significantly stronger than others and thus, generates a final answer/response, or ranked set of answers/responses, for the input question/request.

FIG. 1 depicts a schematic diagram of one illustrative embodiment of a cognitive system 100 implementing a request processing pipeline 108, which in some embodiments may be a question answering (QA) pipeline, in a computer network 102. For purposes of the present description, it will be assumed that the request processing pipeline 108 is implemented as a QA pipeline that operates on structured and/or unstructured requests in the form of input questions or input data in which questions are implied, e.g., an input audio sample may be considered to have an implied question of "What is this sound and where is it from?" as well as "Has an event occurred within the monitored environment?" One example of a question processing operation which may be used in conjunction with the principles described herein is described in U.S. Patent Application Publication No. 2011/0125734, which is herein incorporated by reference in its entirety. The cognitive system 100 is implemented on one or more computing devices 104A-D (comprising one or more processors and one or more memories, and potentially any other computing device elements generally known in the art including buses, storage devices, communication interfaces, and the like) connected to the computer network 102.

For purposes of illustration only, FIG. 1 depicts the cognitive system 100 being implemented on computing device 104A only, but as noted above the cognitive system 100 may be distributed across multiple computing devices, such as a plurality of computing devices 104A-D. The network 102 includes multiple computing devices 104A-D, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 enables question processing and answer generation (QA) functionality for one or more cognitive system users via their respective computing devices 110-112. In other embodiments, the cognitive system 100 and network 102 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, sub-systems, and/or devices other than those that are depicted herein.

The cognitive system 100 is configured to implement a request processing pipeline 108 that receive inputs from various sources. The requests may be posed in the form of a natural language question, natural language request for information, natural language request for the performance of a cognitive operation, input data (such as audio sample data or the like), etc. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-D on the network 102 include access points for content creators and cognitive system users. Some of the computing devices 104A-D include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus or corpora of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input questions/requests to the cognitive system 100 that are answered/processed based on the content in the corpus or corpora of data 106. In one embodiment, the questions/requests are formed using natural language and are associated with input data that is to be processed in accordance with those questions/requests or are applied to already collected data. However in other embodiments, the "questions" or "requests" are represented by the input data itself, with the questions or requests being implied in the fact that input data is received. The cognitive system 100 parses and interprets the input question/request and/or input data via a pipeline 108, and provides a response containing one or more answers to the question posed, response to the request, results of processing the request and input data, or the like. In some embodiments, the cognitive system 100 provides a response to users in a ranked list of candidate answers/responses while in other illustrative embodiments, the cognitive system 100 provides a single final answer/response or a combination of a final answer/response and ranked listing of other candidate answers/responses. In some illustrative embodiments, the final answer/response is in the form of the performance of a responsive action which may include, for example, local audible/visual message/request output actions, remote communication actions, and local device control actions.

The cognitive system 100 implements the pipeline 108 which comprises a plurality of stages for processing an input question/request based on information obtained from the corpus or corpora of data 106. The pipeline 108 generates answers/responses for the input question or request based on the processing of the input question/request and the corpus or corpora of data 106. The pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 106. Based on the application of the queries to the corpus or corpora of data 106, a set of hypotheses, or candidate answers/responses to the input question/request, are generated by looking across the corpus or corpora of data 106 for portions of the corpus or corpora of data 106 (hereafter referred to simply as the corpus 106) that have some potential for containing a valuable response to the input question/response (hereafter assumed to be an input question). The pipeline 108 of the IBM Watson™ cognitive system then performs deep analysis on the language of the input question and the language used in each of the portions of the corpus 106 found during the application of the queries using a variety of reasoning algorithms.

The scores obtained from the various reasoning algorithms are then weighted against a statistical model that summarizes a level of confidence that the pipeline 108 of the IBM Watson™ cognitive system 100, in this example, has regarding the evidence that the potential candidate answer/response is inferred by the question/request. This process is to be repeated for each of the candidate answers/responses to generate ranked listing of candidate answers/responses which may then be presented to the user that submitted the input question, e.g., a user of client computing device 110, or from which a final answer is selected and presented to the user. More information about the pipeline 108 of the IBM Watson™ cognitive system 100 may be obtained, for example, from the IBM Corporation website, IBM Redbooks, and the like. For example, information about the pipeline of the IBM Watson cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In the context of the present invention, cognitive system 100 may be specifically configured to provide a cognitive functionality for identifying and classifying variable wake sounds detected by one or more audio capture devices of a smart speaker device. The cognitive system 100 is further specifically configured to classify the detected sounds in captured audio data as to their type and the type of sound sources making the detected sounds. The cognitive system 100 may further analyze combinations of identified sounds and other non-audio sample based information in a cognitive manner to determine whether events have occurred within, or in association with, a monitored environment, a risk or danger level of any such events, and any responsive actions to be performed in response to the detected event and its corresponding risk or danger level. Moreover, the cognitive system 100 may trigger or initiate the performance of any such responsive actions by way of an associated smart speaker device associated with the monitored environment. The cognitive system 100 may be part of the smart speaker system 120 or may operate in conjunction with a smart speaker system 120.

The smart speaker system 120 is shown as a separate entity from the smart speaker device 140, which is present in the monitored environment 150, and is shown as being provided by a single server computing device 140 that is specifically configured to implement the cognitive system 100 and smart speaker system 120. However, the present invention is not limited to such a configuration. To the contrary, the smart speaker system 120 may be integrated into the smart speaker device 140 in some embodiments. In other embodiments, the smart speaker system 120 may be distributed across a plurality of server computing devices 104A-104D, such as in a cloud computing system or the like. Various components 122-129 of the smart speaker system 120 may be provided on different computing devices.

As shown in FIG. 1, the smart speaker system 120 comprises an audio sample analysis and classification engine 122, an event identification engine 124, a responsive action performance engine 126, a sound and event model repository 128, and a configuration information and knowledge base interface 129. The smart speaker system 120 operates in conjunction with one or more smart speaker devices 140 in the same or different monitored environments 150. The smart speaker devices 140 each comprise one or more audio capture devices 142, such as microphones, and one or more audio output devices 144, such as speakers. The smart speaker device 140 may further comprise local processing capability to perform some initial processing of captured audio samples to render them as data, perform some local evaluation of audio samples with regard to the audio sample pattern and feature analysis, outputting data as audio output and processing audible responses, and also process data for performing local control of enabled wireless devices.

While FIG. 1 shows the audio capture device(s) 142 being integrated with the smart speaker device 140, in some illustrative embodiments, a distributed array of audio capture devices, within or associated with a monitored environment, that are in multiple smart speaker devices or otherwise provided and able to communicate with the smart speaker device 140 may be implemented. In some embodiments, the audio capture devices may be part of a smart speaker device 140 that is mobile within the monitored environment 150, such as part of a robotic chassis whose movement is either automatically guided through the monitored environment or controlled remotely by a human operator. The audio capture devices 142 operate to capture audio data, e.g., data representing the waveform of sound captured from the monitored environment 150. The audio data (audio sample) may then be locally stored, such as in a buffer of the smart speaker device 140, and/or remotely stored and analyzed to identify the sounds present in the audio data. For example, the analysis of the audio data may comprise first determining, such as at a local level, whether the captured audio data represents one or more sounds that may be significant for additional analysis, i.e. sounds that are distinct from learned ambient sounds of the monitored environment and which pass an initial set of criteria, which may be user configurable, indicating a need for further analysis.

That is, the audio capture device(s) 142 of the smart speaker device 140 captures audio samples from the monitored environment 150 and may locally identify the audio samples as wake sounds. For example, as noted above, the smart speaker device 140 or system 120 may recognize any sound that is significantly different from ambient sounds learned to be present at particular times of day for the particular monitored environment in which the smart speaker system's audio receivers are present. As noted above, the logic of the smart speaker device 140, and/or the smart speaker system 120, may be trained over a training period of time to recognize ambient sounds for particular times of day. For example, over the course of one or more days of operation, the smart speaker device 140 may capture audio samples and their corresponding timestamps, extract features of these audio samples, and present the audio samples for user feedback to indicate the type of sound, the type of sound source from which the sound was generated, and may even classify the sound as am ambient or non-ambient sound, i.e. a normally occurring sound for the monitored environment for the specified time of the day. Based on the storage of such audio samples and their corresponding timestamps, captured audio samples may be compared to these ambient sound samples to determine if the audio sample is likely an ambient sound or a wake sound.

The ambient sound sample information may be stored locally in a storage device of the smart speaker device 140 or remotely, such as in the sound and event model repository 128 in association with an identifier of the monitored environment 150. In addition, the smart speaker device 140 may access information specific to the monitored environment 150 and/or the user of smart speaker device 140 to determine calendar information indicative of particular types of occurrences within the monitored environment 150, e.g., regular events occurring within the monitored environment 150 which are considered ambient events, holidays and other regular occurrences where certain types of sounds are determined to be ambient, e.g., large bang sounds are more prevalent on July $4^{th}$ and December $31^{st}$ than on other days of the year.

This information may be processed in the smart speaker system 120 and/or at a local level in the smart speaker device 140 which may have some logic for making initial determinations as to whether a sound is a variable wake sound or an ambient sound. For ambient sounds, the smart speaker device 140 may discontinue further processing of the audio sample as it is determined to be an ambient sound and not requiring more advanced analysis. For wake sounds, further processing may be initiated to identify and classify the wake sound and perform additional cognitive operations.

With the mechanisms of the illustrative embodiments, the wake sounds are variable and do not require a fixed key word or phrase to be spoken to initiate processing of subsequent audio samples. Any sound that is determined to not be an ambient sound may be a wake sound which is then submitted to cognitive processing for identification and classification and evaluation of events and responsive actions. These variable wake sounds may take many different forms depending on the particular implementation and may include, for example, sounds of a dog barking, loud noises, coughs, calls for help, fire alarms, carbon monoxide alarms, machines making improper noises (e.g., due to a defect, incident, or worn part), the speaking of a code/token such as a prime number or emergency word/phrase (e.g., as a user security signal or the like), whistling, the sound of someone falling to the floor, pest noises (e.g., mice, bees) in a wall of the environment, a car accident, baby or child crying, glass breaking, doorbells, or any other distinguishable sound that may indicate something occurring within the monitored environment, other than a normal ambient sound situation, that is of importance for performing a responsive action. A registry or database of sound patterns, sound features, or the like, and their corresponding sound types and source types may be provided for use in classifying detected sounds into a corresponding type of sound from a particular type of sound source. In FIG. 1, this registry, archive, or database is referred to as the sound and event model repository 128 where the combination of sound patterns, sound features, sound types, sound source types, and other characteristic information about identifiable sounds are referred to as a sound model. The event models are representations of the correlations of identified sounds, sequences of sounds, or other patterns of identified sounds indicative of events occurring within a monitored environment, for use in determining whether a corresponding event is or has occurred within the monitored environment, e.g., an event model may indicate that a glass breakage sound, followed by a crunching glass sound, followed by a moving of furniture or a sound of searching through drawers or the like, is indicative of a break-in event which has a corresponding risk or danger level of high.

Assuming a capture audio sample (or audio data) comprises a wake sound, a more cognitive and detailed analysis of the audio sample is performed by the audio sample analysis and classification engine 122 of the smart speaker system 120. That is, in one illustrative embodiment, the smart speaker device 140 performs an initial analysis to determine if the captured audio sample represents something that is not an ambient sound. In response to determining that the sound(s) in the captured audio sample are not ambient sounds, the capture audio sample may be sent to the cognitive system 100 which operates in conjunction with the smart speaker system 120 to perform cognitive analysis of the captured audio sample via the request processing pipeline 108. The audio sample analysis and classification engine 122 comprises a plurality of different algorithms and logic for analyzing the captured audio sample with regard to a variety of different audio characteristics and may be utilized in one or more stages of the pipeline 108 to parse and extract features of the capture audio sample, analyze them, and generate hypotheses as to the type of sound(s) and type of sound sources that are represented in the captured audio sample, which are then evaluated based on evidential information to rank the hypotheses and generate a final result indicating the determined type of sound(s) and their sources present in the captured audio sample. This process may involve matching with stored sound models present in the sound and event model repository 128 and may further involve evaluation of configuration information for the particular monitored environment 150, the user of the smart speaker device 140, calendar information, and other information in various knowledge bases.

For example, such analysis may comprise performing pattern analysis, feature extraction (e.g., amplitude, frequency, duration, etc.), and the like. The patterns and/or features may be used as a basis for comparing the audio sample, with sound models stored in the sound and event model repository 128 to thereby indicate a nature or type of the sound(s) in the audio sample and/or the nature or type of the sound sources generating the sound(s) in the audio sample. Pattern analysis may be applied to compare the audio sample waveform patterns to the stored sound models to determine a degree of matching of the captured audio sample to the stored sound models in the repository 128. Similarly, feature comparisons may be used to determine a degree of matching between features of the captured audio samples with stored sound models in the repository 128. In this way, the identification or classification of sounds in a captured audio sample may be generated with regard to stored sound models that have a highest degree of matching or confidence in the matching.

The particular type of analysis performed on the captured audio sample may take many different forms depending on the particular implementation and will typically include a joint analysis of multiple different characteristics of the captured audio sample to perform a cognitive identification and classification of the sound(s) in the audio sample, e.g., by matching to a stored sound model, evaluation of whether the sound(s) either by themselves or in combination with historical captured sound information for a specified time period, constitute an event, determining a danger or risk level of the event, and determining and initiating a responsive action to the event. In some implementations, the audio capture device(s) 142 of the smart speaker device(s) 140 are able to triangulate or otherwise identify the location within the monitored environment from which the sound is sampled and may track movement of sound sources within the monitored environment, e.g., tracking amplitude and timing of received audio data from one or more audio capture devices indicating movement towards or away from the respective audio capture devices. Such location and/or movement detection may be based on sound amplitudes received at various audio capture devices positioned in different positions of the monitored environment, e.g., the same sound received at different audio capture devices with different amplitudes indicates the source being closer to audio capture devices where the amplitude is relatively greater and further away from audio capture devices with the amplitude is relatively lower.

The location and/or movement information may be used to assist with cognitive analysis of the audio data to identify the classification or identification of the sound, e.g., knowing a relative location of the smart speaker device 140 to other portions of the monitored environment, the smart speaker device 140 may identify portions of the monitored environment 150 from which sounds are being detected and the potential sources of such sounds in those locations to thereby identify a subset of potential sound samples that the captured sound may match, e.g., knowing that the sound source is located in a kitchen of the monitored environment 150, sound models associated with kitchen related sound sources may be searched primarily, or weighted more highly, than other sound models associated with other portions of the monitored environment. Such location information for the stored sound models may be stored in those sound models in addition to the other information previously described above, such that sound models may be grouped or classified by location. This allows for ease of search based on location and/or weighting of sound models for matching purposes.

In some illustrative embodiments, natural language processing of spoken words may be performed by converting the spoken words represented in the captured audio data to a textual representation and performing natural language processing on the textual representation. The natural language processing may operate to attempt to determine what is being said to determine how to respond to the spoken words. Such natural language processing is generally known in the art.

In some embodiments, the analysis of the captured audio sample may utilize both natural language processing and audio characteristic analysis to perform sentiment analysis. That is, sentiment analysis may be performed on captured audio data to determine moods, intents, or the like, of the sources of the captured audio sample. For example, the natural language content of the audio data may be analyzed to identify particular terms and phrases indicative of moods, intents, and the like. Moreover, various audio characteristics, or features, may be evaluated for sentiment such as rising pitch, sharp increases in amplitude of the captured audio, audio data patterns indicative of crying, moaning, screaming, and the like, etc. This sentiment analysis may be combined with other types of analysis, such as identification of sound type, sound source type, location, and the like, in a joint analysis directed to identifying events occurring within or in association with a monitored environment. For example, if the smart speaker device 140 captures audio samples indicative of a rising pitch, terms generally associated with anger or frustration, and breaking glass, an event may be triggered indicating a domestic disturbance and appropriate action may be taken, such as asking a user if they need assistance, automatically initiating a call to a first responder contact number, recording the audio occurring in the monitored environment 150 for evidential purposes at a later time by authorities, or the like.

In some embodiments, a history of captured audio data, and the sound identification results associated with the captured audio data, e.g., the identification of the type of sound and the type of sound source of the sound, may be stored for use in cognitively evaluating the pattern of different identified sounds to determine whether an event is occurring within the monitored environment that would trigger a responsive action, or reaction, by the smart speaker system 120, e.g., the outputting of an audible message, the outputting of an audible request or question to a user, the triggering of a display of information, the triggering of a visual indicator, such as a light on the smart speaker device, the initiating of a communication (automated telephone call, electronic mail message, instant text message, or the like) to another device via a wired or wireless connection, or the like. The history may be stored in a local buffer memory of the smart speaker device 140 or other temporary storage of the smart speaker system 120 (not shown) in association with an identifier of the smart speaker device 140, or the like. The history preferably is configured to store captured audio samples and the corresponding identification of sounds present in the audio samples as determined from the smart speaker system 120, i.e. a tag or identifier of the matching sound models in the sound and event model repository 128 for a predetermined time window, or period of time, consistent with an amount of time required to identify events occurring within or in association with the monitored environment. The period of time may be a configuration parameter which may be stored in the configuration information and knowledge base interface 129.

The information stored in the buffer or temporary storage may be used by the event identification engine 124 as a basis for determining whether an event has occurred within or in association with the monitored environment 150. This may be done on a continuous basis as audio information is added to the buffer or temporary storage, such as in the case of a moving time window, or may be done on a periodic basis, such as at the elapse of each period of time for which the buffer or temporary storage is used to store captured audio sample and sound identification information (collectively referred to as sound information).

This evaluation by the event identification engine 124 may involve applying event models from the sound and event model repository 128 to the stored sound information in the buffer or temporary storage to determine if criteria of the event model are satisfied to a threshold level of certainty to indicate that the corresponding event has occurred. That is, the cognitive analysis of the identified sound(s) in the captured audio samples over the specified time window may involve utilizing stored or learned knowledge about events and the types of sounds associated with such events which are represented as event models in the sound and event model repository 128. This stored or learned knowledge may be provided in the event models as machine executable rules stored in the sound and event model repository 128 of the smart speaker system 120, in the local smart speaker device 140 itself, or a combination. The machine executable rules may be stored as template data structures, where each template data structure may represent a different type of event and may comprise one or more rules for matching as well as additional information for evaluating the event when it is matched, e.g., a default risk or danger level, an identification of a responsive action to take, etc.

The stored and learned knowledge represented in the rules or templates of the event models may specify one or more sounds indicative of an event. The event model may further specify timing constraints, sequences, particular combinations of sounds, particular locations of sounds, or the like, that are indicative of the event. The sound information stored in the buffer or temporary storage may be compared to such criteria and a degree of matching of the sound information stored in the buffer or temporary storage to the event model may be determined and this degree of matching may be compared to a predetermined threshold requirement for determining that the event model has been matched. If the event model has been matched, then the event is determined to have occurred in association with the monitored environment 150.

In determining whether an event is occurring within or in association with the monitored environment 150, the degree of matching of the sounds found in the captured audio samples to the criteria specified in these rules/templates may be calculated to determine a risk or danger level of the perceived event associated with the monitored environment 150. For example, the risk or danger level may be a combination of a basic or default risk or danger level associated with the event defined by the rule/template, weighted by the degree of matching of the sounds, or patterns of sounds, identified in the captured audio for the specified time window. For example, a template may have one or more rules specifying criteria for an event of a "break-in" at the monitored environment 150. The rules may specify the sounds as including glass breakage, security alarm sounds, crunching glass, footsteps, shuffling of contents of a room, etc. Based on how many of these sounds are identified in the captured audio data during the specified time window, a degree of matching may be calculated and used to weight the basic or default risk/danger level of the event, e.g., the default risk/danger level may be considered high, but if the number of matching sounds is low, then the risk/danger level may be reduced accordingly. Alternatively, the degree of matching may simply be used as a measure of confidence that the event is actually occurring or has occurred in association with the monitored environment 150 and if the confidence is sufficiently high, e.g., equal to or greater than a predetermined threshold, which may be user configurable, then the event specified in the rules/template is considered to be a match and the corresponding risk/danger level for that event is utilized.

Assuming an event model is matched by the sound information stored in the buffer or temporary storage, the responsive action performance engine 126 may evaluate the event to determine an appropriate responsive action to be performed, if any, and may initiate performance of that responsive action. The particular responsive action may be dependent upon the type of the matching event and its determined danger or risk level, as well as any specific responsive actions that may be specified in the matched event model, if any. The determined danger or risk level may be determined by the responsive action performance engine 126 based on the danger/risk level associated with the identified event, such as by using a specified default danger/risk level, possibly weighting the default danger/risk level by a degree of matching with the event model criteria, as described above, and evaluation of other relevant factors including time of day (break-ins at night or when residents tend to be home are relatively higher danger/risk level than other times of the day), user preferences or configuration information for such events indicating user determined danger or risk levels for the particular event (e.g., one user may desire to rank dog barking sounds as relatively higher danger/risk level than another user), and other information present in the configuration information and from other knowledge bases. The danger or risk level along with the event type may be correlated with a responsive action which is then initiated. This responsive action may be a responsive action specifically associated with the event in the event model itself, may be a responsive action performed in addition to any specific responsive action indicated in the event model, or may be a selection of one of a plurality of possible responsive actions set forth in the event mode based on the determined level of danger or risk associated with the event.

The responsive actions may take many different forms depending on the particular type of event. However, these responsive actions may generally be categorized into local audible/visual message/request output actions, remote communication actions, and local device control actions. Of course, a combination of such actions may also be utilized. These responsive actions may make use of the audio output device(s) 144 of the smart speaker device 140, may make use of control capabilities of the smart speaker device 140 to control other devices within or associated with the monitored environment 150, such as via a wireless network and home automation products, e.g., controllable lights, door locks, appliances, and the like.

As mentioned previously, examples of local audible/visual message/request output actions include, but are not limited to, outputting a natural language message in an audible format indicating the nature of a detected event, outputting a natural language request in an audible format indicating a nature of the detected event and requesting instructions from a user (followed by appropriate action based on the user response), illuminating or otherwise controlling the turning on/off of a visual indicator as well as controlling characteristics of the visual indicator, e.g., color, textual message displayed, blinking, rate of blinking, or other visual characteristics, and the like. Examples of remote communication actions include, but are not limited to, initiating an automated telephone call to a user's registered telephone number, initiating a call to a security company managing the security of the monitored environment, initiating a call to emergency services personnel, sending an electronic mail message to a user associated with the smart speaker system indicating the detected event with/without attachment of audio data for playback, sending an instant message to a registered device associated with a user, or the like. Examples of local device control actions include, but are not limited to, turning on/off lights, activating/deactivating security alarms, locking/unlocking doors, turning on/off video feeds from security video cameras, controlling the viewing position of such security video cameras, e.g., by controlling a motor in the video camera to pan the camera to focus on a location where the smart speaker system determines the source of a detected sound may be present, playing music or other audio, or the like.

The responsive action performance engine 126 of the smart speaker system 120 composes the corresponding responsive actions and causes the responsive actions to be performed via the smart speaker device 140. This may involve accessing registered contact information for the user, such as may be stored in configuration information or a user profile data structure of the configuration information and knowledge base interface 129, to obtain information for sending communications and what those communications should contain. This may further involve accessing other knowledge bases, via the configuration information and knowledge base interface 129, located remotely to obtain information needed to formulate the content and/or control information for composing and/or directing the responsive actions, e.g., unique identifiers of devices to be controlled, identifiers of on-line retailers from which products/services may be obtained, contact information for first responders or emergency services in the geographic area of the monitored environment 150, and the like.

Thus, based on the type of event, source of the sounds identified in the captured audio data, and the risk/danger level associated with the event, one or more corresponding responsive actions are identified by the smart speaker system 120 implemented in, or in association with, the cognitive system 100. The logic of the smart speaker system 120 may interact with or be integrated with various stages of the pipeline 108 of the cognitive system 100 to achieve this functionality. For example, the audio sample analysis and classification engine 122 may operate in conjunction with, or even may be implemented as, the pipeline 108 in cognitive system 100 as the functionality of the engine 122 involves an input parsing, analysis, and decomposition stage of the pipeline 108 as well as hypothesis generation, evidence scoring, synthesis, and final result generation to identify sounds in a received audio sample from the smart speaker device 140. Similarly, the event identification engine 124 may be integrated in, or work in conjunction with, one or more stages of the pipeline 108 to identify events as described above. In some embodiments, the event identification engine 124 may also be implemented as a pipeline 108 entirely and this pipeline may be separate from that of a pipeline used to identify individual sounds in an audio sample, e.g., a first pipeline for identifying sounds in a captured audio sample and a second pipeline for identifying events based on the sounds in captured audio samples and stored in the buffer or temporary storage.

In the above example embodiment, the time window for which sound information is stored in the buffer or temporary storage is described as a relatively short time window and associated with a time period determined to be sufficient to identify events occurring within or associated with the monitored environment. However, in some illustrative embodiments, the history of captured sounds may be maintained in the smart speaker system 120 in a more permanent fashion for use in later playback operations, such as in a history data structure (not shown) associated with the particular monitored environment 150 or smart speaker device 140. For example, the buffered audio data and corresponding sound identifications may be moved from the buffer memory or temporary storage to a more permanent memory, e.g., a hard disk storage system, remote storage system, or the like, for later retrieval and playback when desired. Moreover, such a stored historical playback may be made accessible to a user via another remotely located computing device, e.g., a user may be notified, via an electronic communication (e.g., email, instant message, or the like) sent to their computing device 112, mobile computing device 160, or the like, of an event occurring and be given a link or other selectable mechanism by which to access the stored audio data and sound identification information from the permanent storage of the smart speaker system 120.

It should be appreciated that in some illustrative embodiments, the sound and event model repository 128 may store models applicable to multiple different smart speaker devices in multiple different monitored environments. Moreover, the sound and event model repository 128 may learn and store models obtained from a variety of different monitored environments. For example, based on user feedback indicating the type and/or source of a sound, the user specified classification of the sound and sound source may be stored in association with the captured audio data in the repository 128 to thereby dynamically modify and improve the repository 128 by including additional models indicative of a particular type of sound or sound source. A similar operation can be performed for event models as well. Furthermore, such operations may be performed automatically by the system in response to a smart speaker device capturing audio data determined to be abnormal to assist in detecting normal versus abnormal sounds in other monitored environments. Thus, a collective learning of types of sounds and types of sound sources, as well as events, may be achieved using a plurality of different smart speaker devices in a plurality of different monitored environments.

As touched upon above, the operation of the smart speaker system 120 and the smart speaker device is user configurable in many different ways so that the user can identify the types of events for which the smart speaker is to monitor the environment, the level of confidence and/or danger/risk level required for different types of responsive actions to be performed, the types of responsive actions to be performed in response to particular types of events, schedules of when certain types of events are to be monitored for, schedules of when the smart speaker system is to disable monitoring, such as for privacy or security reasons, and the like. For example, a user may make use of the computing device 112, a mobile computing device 160, or any other data processing device or system to access the smart speaker system 120 and configure the user configurable parameters and provide configuration for storage in the configuration information and knowledge base interface 129. The user may make use of an application running on such a data processing device/system to access the smart speaker system 120 and configure it for use with the user's own smart speaker device 140 and for the monitored environment 150.

Thus, the illustrative embodiments provide mechanisms for implementing a smart speaker system with variable wake sound identification and classification. The illustrative embodiments further provide such a smart speaker system with cognitive analysis capability to identify sounds in captured audio samples and determine events associated with such identified sounds. Moreover, the illustrative embodiments provide mechanisms in the smart speaker system to evaluate such identified events and determine and initiate any appropriate responsive actions based on the type of event, its corresponding danger/risk level, and the like.

The following are examples of various types of operations and functionality that the mechanisms of the illustrative embodiments may perform based on the architecture described above. As noted above, the smart speaker system 120, utilizing the smart speaker device 140 in association with the monitored environment 150, may perform a joint analysis of a sound identified in a captured audio sample by identifying who is speaking the sound (or identifying the source of sound), a cognitive aspect of the sound (e.g., stress of the user), and the movement of the speaker (person) within the monitored environment 150 while he/she is speaking the sound (e.g., a user asks a question while moving from point A to point B in a home, as determined by position-detecting mechanisms associated with the smart speaker device 140). Through analysis of the wake-sound and speaker identity, the smart speaker system 120 may be trained using historical data, and if desired incorporating mechanical turks, to recognize sounds associated with a user's confusion, inquisitiveness, or general need for information, e.g., sentiment analysis as previously described above. In this way, the smart speaker system 120 may become more proactive in waking up, analyzing a buffered text of inquiry, and offering to help answer the implied question or clarify the perceived confusion. For example, natural language processing (NLP) mechanisms may be utilized to create a classification model for a specified cognitive state of sounds for better understanding of the sound, or other utterances associated with the sound and the environment. This classification model may map the analyzed sounds and/or utterances to relevant categories wherein each category, or class, may represent a state of confusion, inquisitiveness, or the like.

For example, consider the following example exchange between a user and the smart speaker (SS) device 140 in the monitored environment 150:

User: "I cannot understand why I can't find AAA batteries! I know I just had some last week!" [pitch rising; sentiment is confused and irritated]
SS: "Hello are you looking for something you can't find?"
User: "Yes."
SS: "Perhaps I can help. Are you looking for AAA batteries?"
User: "Yes."
SS: "OK. May I order some for you? They will arrive tomorrow."

In this exchange, the audio characteristics of the user's initial statement, as well as the terms used in the user's statement, indicate that the user is looking for something, the thing the user is looking for is AAA batteries, and the audio characteristics of the captured audio sample indicate a rising pitch which is indicative of confusion or irritation. From this information, the smart speaker system (SS) determines the event as being that the user is looking for something with the rising pitch being indicative of a higher level of risk/danger (or one could consider this to be a level of importance in responding). As a result, a responsive action of responding with an output message is performed to inquire as to whether the user needs help, with follow on dialogue to achieve a desired level of assistance for the user.

In one illustrative embodiment, an action template, which may be stored locally or on cloud based database, may be used to perform the responsive action. In such an embodiment, the smart speaker system further selects and prioritizes responsive actions using custom defined machine learning algorithms. For example, given an action space A, and a state space (situation) S, a machine learning algorithm, such as a neural network or the like, may be used to estimate the confidence in the responsive action(s) to be taken for the computed risk or danger level. By way of an example, neural networks can be used to estimate parameters in order to choose a label (action). In this case, multiple labels (multi-class) can be estimated with confidence. If a set of actions are above a threshold, they are triggered for the responsive action. Consider the following example of triggering a responsive action set: {Contact an emergency service, Contact a first responder, Place a phone call to a certain entity}: Given a state space S={Detected danger wake sound is high, confidence: 0.8, estimated confused state of sound: 0.75, probability of estimated sound reputation: 0.9, Computed risk Score R: High}.

In some embodiments, the smart speaker system 120 stores sounds (e.g. possibly dangerous sounds) for playback to the user upon a request being received from a user via their computing device 112 or mobile device 160, or through spoken requests to the smart speaker device 140. In some cases, the smart speaker device 140 may detect through cognitive analysis, the return of the user to the monitored environment 150, such as when the user returns home for the day, and may automatically initiate a dialogue with the user to determine if the user wishes to hear a log of the events detected and corresponding audio samples for a specified time period, e.g., since the user was last in the monitored environment 150, for the last day, etc.

In some embodiments, rather than waiting for a user request or detection of the user's return to the monitored environment 150, the smart speaker system 120, such as in cases of high risk or danger, may automatically initiate a communication with the user, via their computing device 112 or mobile device 160, to playback stored audio samples or otherwise indicate events detected by the smart speaker system 120, e.g., sending an email or instant text message with audio attachment, initiating an automated phone call, or the like. For example, the smart speaker system 120 may send/post the sound or the analysis of the sound on the user's "effective" communication channel, e.g., Twitter™, Whatsapp™, email, etc. based on a determination or learning of what channel the user often uses in a particular context, e.g., time of day, location, etc.

As mentioned above, in some illustrative embodiments, the smart speaker system 120 learns, through a training period, the patterns of sounds encountered daily (e.g., sounds of trash collectors, cars passing by, dogs barking, music playing, etc.) and listens for changes to the sound patterns. In addition, such training may continue after the training period through the user of user feedback and machine learning where the smart speaker system 120 may provide an indication of an event to a user and receive user feedback indicating whether or not that event and its associated sounds, or the sounds themselves, are ambient sounds or regular sounds for that time of day. This allows the smart speaker system 120 to become accustomed to certain routine sounds in the monitored environment 150.

In some illustrative embodiments, the smart speaker system, with permission, may communicate with an analysis module on a separate cloud server, e.g., server 104D in FIG. 1, regarding what a sound is, to help identify it. In some cases, the smart speaker system may make use of Mechanical Turks, i.e. a crowdsourcing repository of human intelligence to assist with performing tasks, to help determine one or more characteristics or identities of the sound(s) in a captured audio sample. For example, in cases where the smart speaker system 120 is unable to identify a matching sound model for a sound in a captured audio sample to a sufficient degree of certainty, the smart speaker system 120 may send the audio sample to a cloud computing Mechanical Turk system, obtain user feedback identifying the sound type, the type of sound source, and other characteristics of the sound, which may then be used to generate a sound model for addition to the sound and event model repository 128.

It should be appreciated that while the above illustrative embodiments assume that audio samples captured by the smart speaker device 140 are those that are within the human perceivable range of sound frequencies, the present invention is not limited to such. Rather, in some illustrative embodiments, the smart speaker device 140 may be sensitive to sounds beyond the normal hearing range (e.g., less than 20 Hz or more than 20 kHz) for providing danger alerts and other purposes. As such, the smart speaker system 120 may be configured to analyze, identify, and classify such sounds and perform event identification and responsive action determinations in a manner similar to that described above, but with sounds outside normal human hearing range. The smart speaker device 140, as part of a responsive action, may also be configured to emit such sounds outside the normal human hearing range, e.g., in response to an event that captured sounds indicate pests or other vermin present within the monitored environment, the smart speaker device 140 may emit sounds to repel pests and vermin.

In some illustrative embodiments, the smart speaker system 120 may record anomalous sounds/noise, or noises that it has been programmed to record, and may perform responsive actions to try to mitigate such noises, e.g., turn off a water faucet or heater in response to a determination that water is running as determined from the sound identification, classification, and event identification, in response to sounds recognized to be a broken water pipe, or potentially from a frozen water pipe (as may be determined by utilizing other sources of information in combination with the audio sample, such as regional temperature and weather forecast data from corresponding sources, or the like). The smart speaker system 120 also may replay the noises (stored audio samples) and describe the context related to the noises and the action(s) that the smart speaker system 120 took in the determined order or sequence.

In some embodiments, the smart speaker device 140 may be mobile and mounted on a robotic chassis or other automated or human controlled mobile platform. As a result, the movable smart speaker device 140 is capable of moving around within the monitored environment 150 or between multiple monitored environments and may capture audio samples from any monitored environments 150 in which it operates. Moreover, location determination algorithms as discussed above may be used to both identify the location of the smart speaker device 140 within the monitored environments 150, as well as the sources of sounds detected by the smart speaker device 140 relative to the smart speaker device 140.

In some illustrative embodiments, the smart speaker device 140 and system 120 may operate retroactively to respond to user inquiries about sounds occurring within a monitored environment 150. For example, the smart speaker device 140 may receive a user input of the type, "Smart Speaker, what was that?" In such a scenario, the user is requesting that the smart speaker device 140 identify a sound that was heard by a human, using its cognitive capabilities and a search for the recorded audio sample in its buffer. This may be useful in situations of home security/health tasks by analyzing audio recorded in a buffer, for user initiated identification of anomalous/dangerous sounds, and even calling for help if the sound is deemed dangerous. The following is an example scenario of an exchange between a user, who is a parent of a small child, and the smart speaker system that is facilitated by the mechanisms of the illustrative embodiments:

Parent wakes up to a sound of coughing.

Parent: "Smart Speaker, what was THAT?"

SS: "Just a second as I check my recording database . . . . This is the sound of a child suffering from croup. Would you like to know more about symptoms and treatment?"

Parent getting out of bed: "Yes."

SS: "Croup, also known as laryngotracheobronchitis, is a type of respiratory infection that is usually caused by a virus. The infection leads to swelling inside the trachea, which interferes with normal breathing and produces the classic symptoms of "barking" cough, stridor, and a hoarse voice. Fever and runny nose may also be present. These symptoms may be mild, moderate, or severe. Often it starts or is worse at night. It normally lasts one to two days. Do you want me to call for medical assistance?"

Parent: "No that's not necessary."

In some illustrative embodiments, the smart speaker device 140 may monitor for "differences" in the surrounding sound, e.g., ambient sound in a particular room, relative to the same monitored environment 150 at a similar time of day in the past. Thus, for example, it may be determined that certain sounds detected in the monitored environment 150 are atypical for the monitored environment 150 in general, atypical for the monitored environment 150 for the particular time of day, and may utilize this information when evaluating whether an event has occurred and/or the danger/risk level of any identified events.

In some illustrative embodiments, the sentiment analytics may be used to determine the sentiments of persons speaking, as well as the sentiments of other persons in the group. The smart speaker system 120 may also optionally analyze certain aspects of the sounds of pets, including sounds of agitation, e.g., barking, intensity of barking, whimpering, or the like, for example, so as to estimate (with some confidence level) that an alert may be warranted as to potential emergency situation at the monitored environment, the need for the pet to be walked or let outside (some pet owners train their pets to utilize a bell or other device for indicating their need to go outside and such sounds could be detected with the smart speaker system of the present invention), or the like. As noted above, in some illustrative embodiments, a responsive action may be to control local mechanisms that are controllable by the smart speaker system. In some cases, if the smart speaker system determines that the pet is needing to go outside, the smart speaker system may automatically operate a motorized pet door to allow the pet access to the outside.

In some cases, the identification of a sound and its significance may be difficult or prone to at least some degree of error. In such cases, a user may wish to establish risk levels of missing some sounds. For example, a user my want the smart speaker system 120 to "err" on the side of sending or causing an alert to be generated in response to an elderly parent having made a sound indicative of falling on the floor, since accommodating some false alarms is less dangerous than missing an actual case of falling. Additionally, the smart speaker system 120 may take input from other sensors, detectors, computing systems, or the like, which may assist in identifying events occurring within the monitored environment 150, such as a fall of an elderly person or the like. For example, the smart speaker system 120 may incorporate a motion detector, camera of other image capture device, that provides input to help increase the confidence of detecting a fall of the elderly occupant of the monitored environment. The configuration information and other information from other sensors, detectors, and the like, may be stored in the configuration information and knowledge base interface 129, for example. If the confidence level exceeds a threshold, the smart speaker system 120 may initiate an responsive action, such as placing a phone call to a certain entity, contacting a first responder, contacting an emergency service, or the like.

As noted above, the smart speaker system may be trained to listen for certain sounds, and it may learn through positive reinforcement and user feedback. A user may also configure the smart speaker system 120 as to what sounds the user wants the smart speaker system 120 to be alert for and what sounds to ignore. For example, the user may specify that the smart speaker system 120 should listen for coughing, falling, or sounds of distress by an elderly occupant of the monitored environment 150, but ignore dog barking sounds or other pet related sounds as the occupant does not currently have a pet.

In some illustrative embodiments, the smart speaker system 120 may be trained regarding a privacy concern of the user or group (e.g., family member discussions) by analyzing the user cultural/social context (e.g., in some social/cultural groups people tend to speak loudly), by determining the user personality type based on sound (e.g., using IBM's Personality Insight™ cloud service), measuring the user historical tone in speaking (e.g., using IBM's Tone Analyzer™ cloud service), etc. For example, in some cultures, tone and personality type of a person can be informative of a privacy type and level of the person. If desired by the particular implementation of the illustrative embodiments, the smart speaker system 120 may be configured with a privacy firewall that can disregard storing sounds if they are deemed to be a privacy concern. In some cases, if a privacy concern is determined to be present, the smart speaker system 120 or smart speaker device 140 may automatically discontinue operation until a time when the privacy concern has dissipated. For example, the smart speaker system/device 120, 140 may be configured to switch itself off (e.g., not to collect audio samples) based on user specified rules and context (e.g., certain periods of the day).

In one illustrative embodiment, a graphical user interface (GUI) may be provided to allow a user to specify privacy concerns. Thereafter, a policy-translator module may translate the user-specification provided via the GUI into privacy filtering policies and rules. For each translated policy or rule, the policy-translator module may further compute the degree of negativity and assign a weight to the policy or rule. In this way, the system may detect, in real-time, privacy concerns.

In another illustrative embodiment, privacy concerns may be learned from historical data. For example, a privacy module may learn a user's concerns (or generally disagreeable characteristics) by analyzing the user cultural/social group/network (e.g., Facebook™, Twitter™, chatting, etc.) and analyzing historical user posts/tweets. This analysis may further include other analyses performed by other systems, such as user personality type determinations, such as by using IBM's Personality Insight™ cloud service or the like, measuring the user historical privacy concerns, etc.

The privacy concerns can also be location dependent. For example, based on a predicted event or activity, appropriate or specialized firewall filters policies and rules can be deployed, so as to decrease the likelihood of inappropriate and not useful information being captured by the smart speaker system.

It should be noted that in some implementations, the monitored environment 150 itself may be mobile and is not limited to buildings or other fixed physical premises. For example, the monitored environment 150 may be a vehicle, such as the cabin of the vehicle or other portion of the vehicle where human occupants may be present. In such embodiments, the smart speaker device 140 and smart speaker system 120 may be used to identify squeaking noises inside an acoustic signal generated during the operation of the vehicle or one of its the components, in the physical premises of a fixed monitored environment, or the like. The acoustic signal may be detected by the smart speaker device 140 and an amplitude spectrum of the acoustic signal may be determined through analysis by the smart speaker system 120 to represent the amplitude distribution in a frequency range across at least two time moments, and the presence of a squeaking noise may be identified by evaluating the at least two amplitude spectra. This information may be used to identify a faulty piece of machinery or equipment in the monitored environment 150.

Also in the vehicle context, the smart speaker device 140 and smart speaker system 120 may be used to record sounds after a collision/crash of the vehicle is detected by the smart speaker device 140. For example, the loud noise of a collision/crash may be used as a basis for detecting a collision/crash event which triggers the smart speaker device to start recording subsequent audio occurring for a predetermined period of time and to remotely store any audio still present in the buffers or temporary storage of the smart speaker device 140 and/or smart speaker system 120 to a more permanent storage location of the smart speaker system 120. Thus, all of the corresponding sounds, including conversations between vehicle occupants, both before and after the collision may be recorded for later playback. This may be useful to help reconstruct the cause(s) leading up the collision and the events occurring thereafter, as well as recording an admission of fault.

There are a plethora of other scenarios and use cases in which the mechanisms of the illustrative embodiments may be implemented, any of which are intended to be within the spirit and scope of the present invention.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104A or client 110 in FIG. 1, or even smart speaker device 140, in which computer usable code or instructions implementing the processes for illustrative embodiments of the present invention are located. In one illustrative embodiment, FIG. 2 represents a server computing device, such as a server 104A, which implements a cognitive system 100 and request pipeline 108 augmented to operate with or implement the additional mechanisms of the illustrative embodiments described herein, i.e. the smart speaker system 120, for example.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8°. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates an example of a cognitive system request processing pipeline used to process an input request or input of captured audio sample data in accordance with one illustrative embodiment. FIG. 3 is provided only as one example of the processing structure that may be implemented to process an input that either explicitly or implicitly requests the operation of a cognitive system to present a response or result to the input request. In particular, with the illustrative embodiments, the request is an implicit request to identify the type of sound(s) in the input captured audio sample data, identify a type of source of the sound(s), determine if an event is occurring or has occurred in the monitored environment, and determine and initiate a responsive action, if any.

The request pipeline of FIG. 3 may be implemented, for example, as the request processing pipeline 108 of cognitive system 100 in FIG. 1. It should be appreciated that the stages of the request processing pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The request processing pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the request processing pipeline 300 comprises a plurality of stages 310-380 through which the cognitive system operates to analyze an input and generate a final response. In an initial input stage 310, the request processing pipeline 300 receives an input request or input data, e.g., an input of captured audio sample data in accordance with the illustrative embodiments, for processing. That is, the smart speaker device captures an audio sample and transmits the audio sample as a data transmission to the cognitive system for analysis. The input data of the captured audio sample is provided to the input stage 310 of the request processing pipeline 300.

In response to receiving the input data, the next stage of the request processing pipeline 300, i.e. the data parsing and analysis stage 320, parses the input data, if necessary converts any detected speech to text and performs natural language processing (NLP) techniques to extract major natural language features from the text, performs audio characteristic analysis to extract major audio features, and classifies those major features according to types. The analysis of the audio sample data may take many different forms as previously discussed above to extract features representative of particular sounds present in the monitored environment including sound intensity analysis, location analysis, natural language content analysis to determine the content of the spoken statements or questions, sentiment analysis, tonal analysis, etc.

Referring again to FIG. 3, the identified major features are then used during the decomposition stage 330 to decompose the major features into characteristics of the audio sample data indicative of particular sounds. One or more queries are applied to the corpora of data/information 345 in order to generate one or more hypotheses. The corpora may comprise configuration information, knowledge bases, sound models, event models, and the like, as previously discussed above.

As a result, the various information for evaluating the major features of the captured audio sample data is collected and sound models are applied to determine degrees of matching between the sound models and the major features of the audio sample data.

The queries are applied to the corpus of information at the hypothesis generation stage 340 to generate results identifying potential hypotheses, e.g., potential matches of sound models to the sounds present in the audio sample data, which can then be evaluated. That is, the application of the queries results in the extraction of portions of the corpus of information, e.g., sound models, matching the criteria of the particular query. These portions of the corpus are then analyzed and used, during the hypothesis generation stage 340, to generate hypotheses of results of processing the input audio sample data. At this stage 340, there may be hundreds of hypotheses generated that may need to be evaluated.

As noted above, in some illustrative embodiments, a filtering or selection of a subset of sound models and/or other information in the corpora 345 may be performed prior to performing the matching operation. For example, as part of the decomposition stage 330, or the hypothesis generation stage 340, a determination of a subset of sound models applicable to the captured audio sample data may be made based on the major features and other context information about the captured audio sample data. For example, if the audio sample originated from a residence and from a kitchen of the residences, a first subset of sound models associated with sound sources in a kitchen of a residence may first be utilized for generating hypotheses. If a sound model that matches the audio sample data is not found with a sufficient level of confidence, then another superset of sound models may be investigated, e.g., sound models associated with a residence and not specifically limited to kitchen sound sources, may be utilized to attempt to find a match. Any number of levels of hierarchy of sound model classifications may be used to perform hypothesis generation with the preference being to search for matches in a lower level classification first with subsequent searches being done a broader and higher levels only if necessary to obtain a desired level of confidence in a match.

The request processing pipeline 300, in stage 350, then performs a deep analysis and comparison of any natural language of the input audio sample data, audio characteristics, and other major features and information associated with the audio sample data and with the criteria of each hypothesis, as well as performs evidence scoring to evaluate the likelihood that the particular hypothesis is a correct classification of the sound(s) in the audio sample data. As mentioned above, this involves using a plurality of reasoning algorithms, each performing a separate type of analysis of the language of the input audio sample data and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In general, however, these algorithms look for particular terms, phrases, characteristics, patterns or the like, that are indicative of a particular type of sound and determine a degree of matching with higher degrees of matching being given relatively higher scores than lower degrees of matching.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the request processing pipeline 300 and/or dynamically updated. For example, the weights for scores generated by algorithms that identify exactly matching sound models may be set relatively higher than other algorithms that are evaluating time of day ambient sound changes. The weights themselves may be specified by subject matter experts or learned through machine learning processes that evaluate the significance of characteristics of audio sample data and their relative importance to overall hypothesis generation. The weighted scores are processed in accordance with a statistical model generated through training of the request processing pipeline 300 that identifies a manner by which these scores may be combined to generate a confidence score or measure for the individual hypotheses.

The resulting confidence scores or measures are processed by a final confidence merging and ranking stage 370 which compares the confidence scores and measures to each other, compares them against predetermined thresholds, or performs any other analysis on the confidence scores to determine which hypotheses are the most likely to be the correct. The hypotheses are ranked according to these comparisons to generate a ranked listing of hypotheses. From the ranked listing of hypotheses, at stage 380, a final hypothesis, e.g., a final classification of the sound(s) in the input audio sample data, and confidence score, is generated and output.

As shown in FIG. 3, in accordance with one illustrative embodiment, the aspects of the smart speaker system 120 may be integrated in, or may be implemented by, the request processing pipeline 300. For example, aspects of the smart speaker system 120 may be integrated into the parsing and analysis stage 320, the decomposition stage 330, hypothesis generation stage 340, hypothesis and evidence scoring stage 350, and the like. It should also be appreciated that similar processing through the pipeline 300 may be performed for event identification as well, based on input data representing a set of audio samples collected over a predetermined period of time, which may be a designated, or rolling, time window. In some cases, different pipelines 300 may be provided for separately performing operations for identifying and classifying sounds in an input audio sample, and for identifying events based on a collection of sounds found in audio samples over a period of time. The pipeline(s) 300 provide support for cognitively processing input audio samples to identify sounds in the audio samples, identify events occurring based on the identified sounds, and determining and implementing responsive actions in response to such events, if appropriate.

Figure 4:
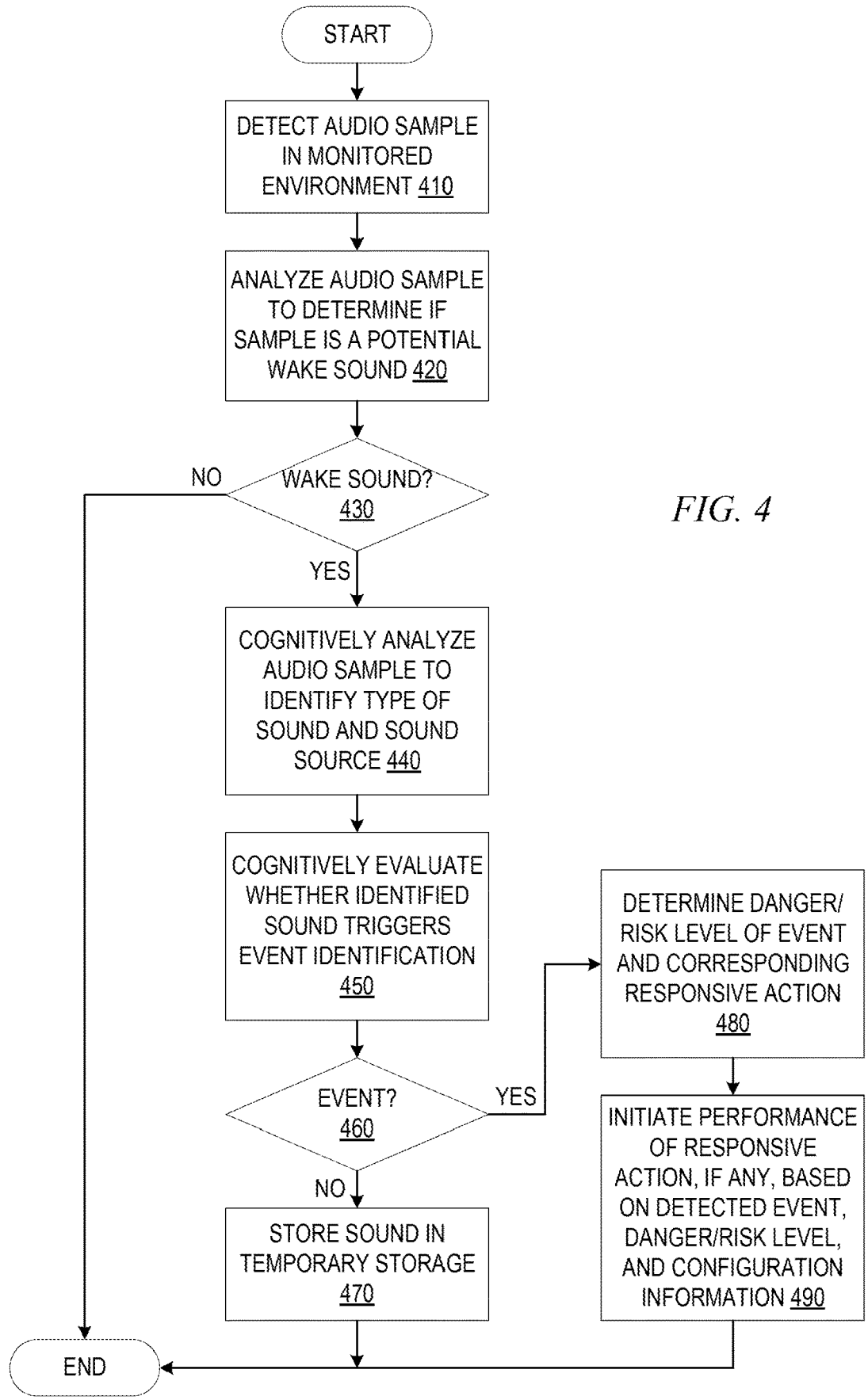
FIG. 4 is a flowchart outlining an example overall operation of a smart speaker system for processing an audio sample captured by a smart speaker device in accordance with one illustrative embodiment.

FIG. 4 is a flowchart outlining an example overall operation of a smart speaker system for processing an audio sample captured by a smart speaker device in accordance with one illustrative embodiment. As shown in FIG. 4, the operation starts with the audio capture device(s) associated with the smart speaker device detecting or capturing an audio sample from sounds occurring within or associated with the monitored environment (step 410). It is important to note that these sounds do not require a wake word or phrase to be used to trigger the audio sample capture, and in fact may not be natural language input at all, but rather may be any variable sound present in or associated with the monitored environment.

The audio sample is analyzed using an initial set of analysis algorithms to determine if the sample is potentially a wake sound needing further detailed analysis (step 420). For example, this operation may perform an initial determination as to whether the audio sample is of a sound that is not an ambient sound for the monitored environment for the particular time of day and day of the week. This may be accomplished by performing analysis of the audio sample to extract major features and compare them to sound models of ambient sounds for the monitored environment (these may be generalized and or environment specific sound models learned over time and/or with user feedback or machine learning techniques). A determination, based on such analysis and comparison to ambient sound models, is then made as to whether the audio sample contains a wake sound requiring further detailed analysis (step 430). If the sound in the audio sample is an ambient sound and not a wake sound, then no further processing is necessary and the operation terminates.

If the sound is a wake sound, a cognitive analysis of the audio sample is performed using a cognitive system request processing pipeline to identify the type of sound and the type of sound source of the sound (step 440). The cognitive analysis may involve the process outlined in FIG. 5, for example, for determining the identification of the sound in the audio sample.

Having identified the sound using the cognitive analysis of step 440, the operation then cognitively determines whether the identified sound indicates or triggers the identification of an event occurring or having occurred in association with the monitored environment (step 450). The sound may itself, or in combination with other sounds over a period of time, indicate such an event. The event identification may be performed in a manner such as outlined in FIG. 6 hereafter, for example.

A determination is made as to whether the results of the cognitive evaluation of the sound for triggering an event identification results in an indication that an event has occurred (step 460). If not, the sound information is stored in a temporary storage for use in identifying events associated with subsequent sounds that may be captured within a specified time window (step 470). If the sound does trigger identification of an event, a cognitive analysis is performed to determine the danger/risk level of the event and a corresponding responsive action to be performed (step 480). Performance of the responsive action is then initiated (step 490) and the operation terminates.

Figure 5:
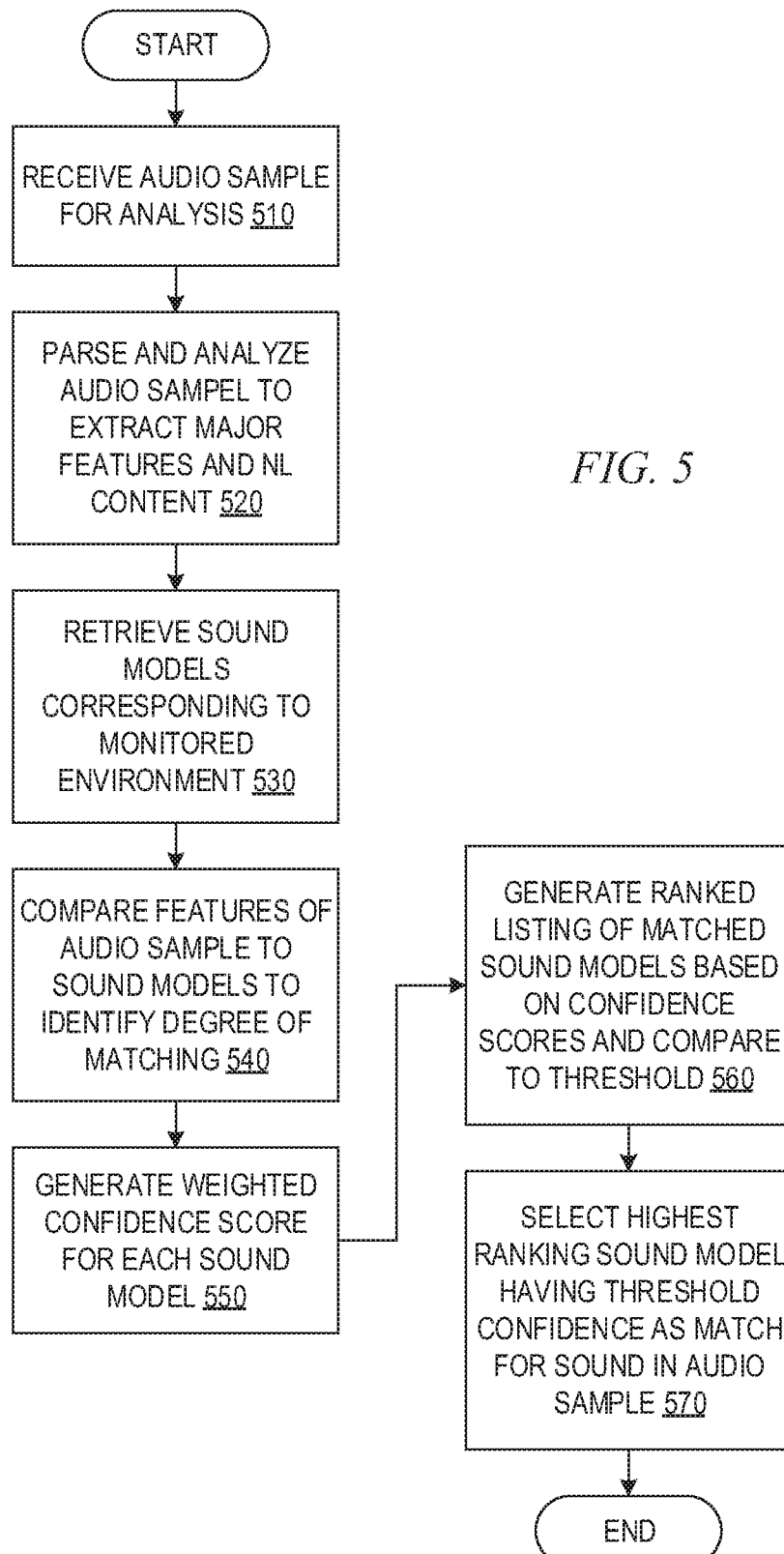
FIG. 5 is a flowchart outlining an example operation for identifying a sound in a captured audio sample in accordance with one illustrative embodiment.

FIG. 5 is a flowchart outlining an example operation for cognitively identifying a sound in a captured audio sample in accordance with one illustrative embodiment. As shown in FIG. 5, the operation starts with receiving an audio sample for analysis (step 510). The audio sample is parsed and analyzed to extract major features of the audio sample including natural language content if any, audio characteristics, sentiment analysis based features, location based features, and the like (step 520). Sound models corresponding to the monitored environment from which the audio sample was acquired are retrieved (step 530). As discussed above, this may involve a subset of sound models corresponding to the monitored environment and location within the monitored environment from which the audio sample was acquired being identified and used in subsequent steps with this set of sound models being expanded in a hierarchical manner if a match is not identified.

The major features of the audio sample are compared to the retrieved sound models to identify a degree of matching with each of the sound models (step 540). A weighted confidence score may be generated based on the degree of matching as well as consideration of other knowledge base factors (step 550). For example, different weights may be applied to sound models based on whether they are general sound models or sound models specific to the monitored environment, e.g., learned over time from the monitored environment. A ranked listing of the matched sound models is generated and the confidence scores are compared to threshold requirements (step 560). A highest ranking sound model with the threshold amount of confidence score is selected as a match to the sound in the audio sample (step 570). The operation then terminates.

Figure 6:
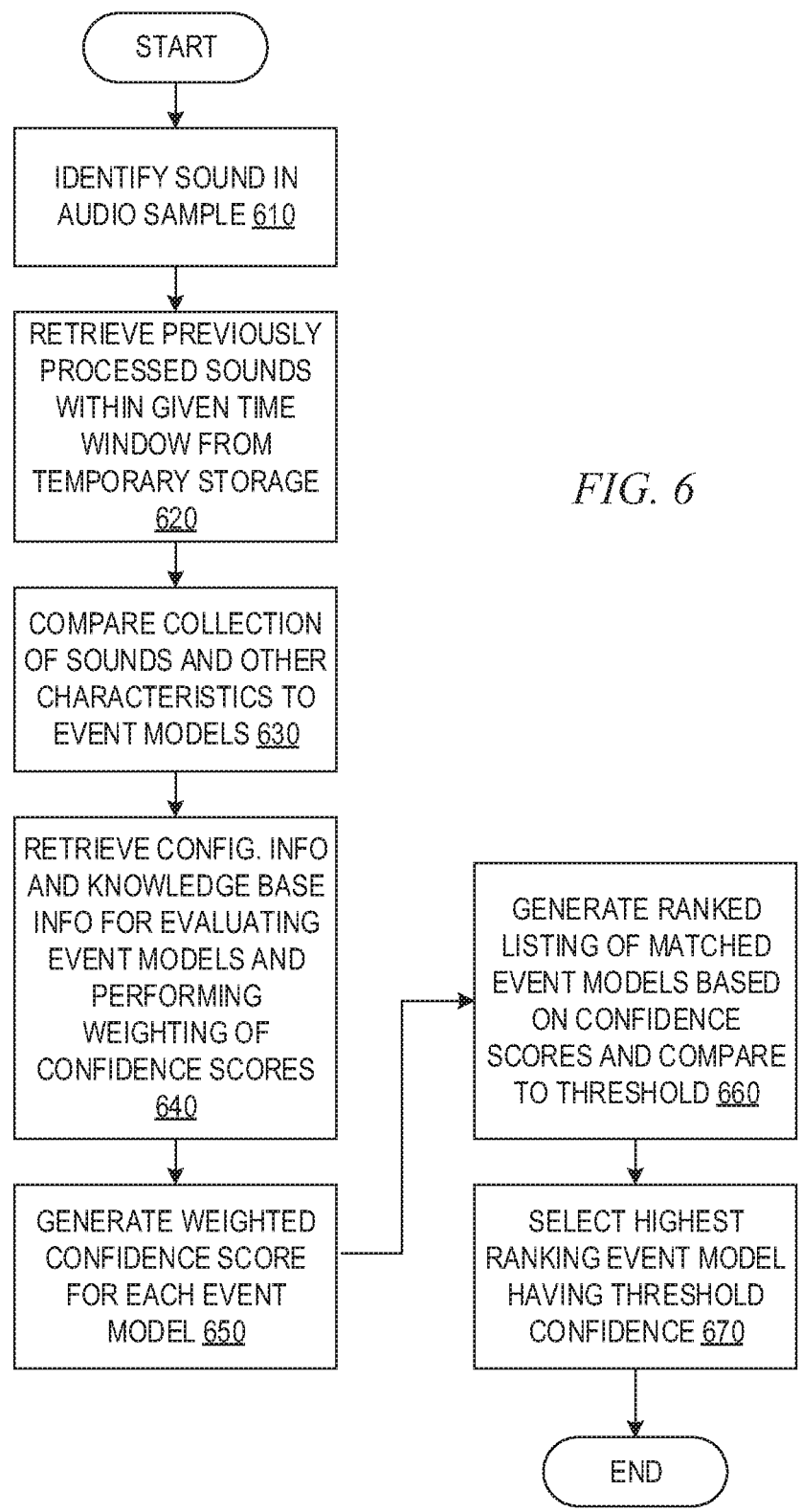
FIG. 6 is a flowchart outlining an example operation for identifying the occurrence of an event in a monitored environment and initiating a responsive action in accordance with one illustrative embodiment.

FIG. 6 is a flowchart outlining an example operation for identifying the occurrence of an event in a monitored environment and initiating a responsive action in accordance with one illustrative embodiment. As shown in FIG. 6, the operation starts with the identification of a sound from an audio sample captured from a monitored environment (step 610). Previously identified and processed sounds within a given time window are identified along with the currently identified sound (step 620). The collection of sounds, their types, their sources, sequence of sounds, and various other audio and content characteristics of the sounds are compared to event models defining criteria for different types of events (step 630). As discussed above, this may involve a subset of event models corresponding to the monitored environment and location within the monitored environment from which the audio sample was acquired being identified and used in subsequent steps with this set of event models being expanded in a hierarchical manner if a match is not identified.

The configuration information and other knowledge base information that may be used to identify events and weighting the confidence scores associated with events occurring in the monitored environment may also be retrieved from corresponding stores (step 640). A weighted confidence score may be generated based on the degree of matching of the various factors of the sounds, configuration information, and knowledge base information (step 650). A ranked listing of the matched event models is generated and the confidence scores are compared to threshold requirements (step 660). A highest ranking event model with the threshold amount of confidence score is selected as a match (step 670). The matching event model may specify a default danger/risk level for the event and a suggested responsive action to be performed. This information may be utilized in steps 480 and 490 of FIG. 4 to determine danger/risk level and a corresponding responsive action to be performed, for example. After identifying the matching event model, the operation outlined in FIG. 5 terminates.

Thus, the illustrative embodiments provide mechanisms for enabling variable wake sound identification and classification by a smart speaker system. The smart speaker system is configured to identify any type of sound that is indicative of a potential event requiring a responsive action occurring within or in association with a monitored environment. The smart speaker system provides cognitive analysis capabilities for cognitively determining the type of the sound, the type of the sound source, whether an event is occurring or has occurred in the monitored environment based on the identified sounds over a specified period of time, and can identify and initiate responsive actions to such events. In this way, the smart speaker system is not tied to having to have predefined fixed wake sounds and may be useful in performing responsive actions to events occurring that are not limited to responding to natural language inquiries.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a smart speaker device comprising an audio capture device and an audio sample buffer, for processing audio sample data captured by the audio capture device, the method comprising:
    capturing, by the audio capture device, one or more audio samples from a monitored environment;
    storing, by the smart speaker device, the captured one or more audio samples in the audio sample buffer, wherein the audio sample buffer stores an amount of captured audio samples corresponding to a specified time window for detecting events occurring within the monitored environment;
    analyzing, by smart speaker device logic of the smart speaker device, the one or more captured audio samples to determine whether the one or more captured audio samples represent a potential wake sound for initiating a responsive action by the smart speaker device, wherein the potential wake sound is a variable sound determined to not be a normal ambient sound of the monitored environment; and
    in response to determining that the one or more captured audio samples represent a potential wake sound for initiating a responsive action by the smart speaker device, initiating performance of the responsive action by the smart speaker device, wherein determining whether the one or more captured audio samples represent a potential wake sound for initiating a responsive action by the smart speaker device, further comprises:
    learning, by the smart speaker device, privacy concern information of a user associated with the monitored environment; and
    applying, by the smart speaker device, a privacy firewall based on the privacy concern information of the user to the one or more captured audio samples to filter and disregard storing of captured audio samples in the audio sample buffer that are determined to be private based on the privacy concern information of the privacy firewall, wherein learning privacy concern information of the user comprises analyzing user cultural or social context associated with the user, determining a user personality type, and measuring user historical speaking tone of the user, and determining a privacy type or level of privacy associated with the user based on the learned privacy concern information, wherein applying the privacy firewall comprises filtering and disregarding storing of captured audio samples that correspond to the determined privacy type or level of privacy.

2. The method of claim 1, wherein analyzing the one or more captured audio samples comprises performing a joint analysis of a plurality of different characteristics of the one or more captured audio samples and matching results of the joint analysis to criteria specified in a plurality of stored sound models in a sound model repository storage associated with the smart speaker device.

3. The method of claim 1, wherein analyzing the one or more captured audio samples to determine whether the one or more captured audio samples represent a potential wake sound for initiating a responsive action by the smart speaker device further comprises:
    transmitting the one or more captured audio samples to a remote smart speaker system service of a remotely located server computing device;
    comparing, by the smart speaker system service, sound patterns of the one or more captured audio samples to stored sound patterns associated with a plurality of sound models in a sound model repository associated with the smart speaker system service; and in response to identifying at least one stored sound pattern of at least one sound model that matches one or more of the sound patterns of the one or more captured audio samples, returning sound type and sound source type information from the at least one sound model corresponding to the at least one stored sound pattern.

4. The method of claim 3, wherein determining whether the one or more captured audio samples represent a potential wake sound for initiating a responsive action by the smart speaker device, further comprises:

applying, by at least one of the smart speaker device or the smart speaker system service, one or more event rules to the sound type and sound source type information from the at least one sound model corresponding to the at least one stored sound pattern;

determining, by at least one of the smart speaker device or the smart speaker system service, whether application of the one or more event rules indicates that an event has occurred in the monitored environment; and initiating, by at least one of the smart speaker device or the smart speaker system service, performance of the responsive action by the smart speaker device, in response to determining that the event has occurred in the monitored event, wherein the responsive action is specified by the one or more event rules.

5. The method of claim 1, wherein analyzing the one or more captured audio samples to determine whether the one or more captured audio samples represent a potential wake sound for initiating a responsive action by the smart speaker device, comprises:

determining at least one of location or movement information, in the monitored environment, of one or more sources of the one or more captured audio samples; and cognitively classifying the one or more captured audio samples based on the determined at least one of location or movement information of the one or more sources of the captured audio samples.

6. The method of claim 1, wherein determining whether the one or more captured audio samples represent a potential wake sound for initiating a responsive action by the smart speaker device comprises applying user specified configuration information to classification of the one or more captured audio samples, wherein the user specified configuration information specifies user specific types of sounds for which responsive actions are to be performed.

7. The method of claim 1, wherein the responsive action is at least one of outputting of an audible message, outputting of an audible request or question to a user and listening for an audible response from a user which is then processed by the smart speaker device, triggering of a display of information on a display associated with the smart speaker device, triggering of a visual indicator on the smart speaker device, controlling an operation of another device to perform an operation within the monitored environment, or initiating a communication to another device via a wired or wireless connection.

8. The method of claim 7, wherein the responsive action is initiating the communication to another device via a wired or wireless connection, and wherein the communication comprises an indication of an identified event that has occurred in the monitored environment, and a recording of the one or more captured audio samples corresponding to the event for playback by a device receiving the communication.

9. The method of claim 1, wherein determining whether the one or more captured audio samples represent a potential wake sound for initiating a responsive action by the smart speaker device comprises:

learning, by the smart speaker device, ambient sound patterns present in the monitored environment at various times of a day; and determining whether or not a sound pattern in the one or more captured audio samples is different, by at least a threshold amount, from the ambient sound patterns learned to be present in the monitored environment at the time of day that the one or more captured audio samples were captured by the audio capture device.

10. The method of claim 1, further comprising determining an event or activity occurring within an environment of the smart speaker device, and selecting a specialized firewall policy associated with the event or activity, wherein applying the privacy firewall comprises applying the specialized firewall policy for the event or activity occurring within the environment.

11. A computer program product comprising a computer readable storage medium having a computer readable program stored therein, wherein the computer readable program, when executed in a smart speaker device, causes the smart speaker device to:

capture one or more audio samples from a monitored environment;

store the captured one or more audio samples in an audio sample buffer, wherein the audio sample buffer stores an amount of captured audio samples corresponding to a specified time window for detecting events occurring within the monitored environment;

analyze the one or more captured audio samples to determine whether the one or more captured audio samples represent a potential wake sound for initiating a responsive action by the smart speaker device, wherein the potential wake sound is a variable sound determined to not be a normal ambient sound of the monitored environment; and in response to determining that the one or more captured audio samples represent a potential wake sound for initiating a responsive action by the smart speaker device, initiate performance of the responsive action by the smart speaker device, wherein determining whether the one or more captured audio samples represent a potential wake sound for initiating a responsive action by the smart speaker device, further comprises:

learning privacy concern information of a user associated with the monitored environment; and applying a privacy firewall based on the privacy concern information of the user to the one or more captured audio samples to filter and disregard storing of captured audio samples in the audio sample buffer that are determined to be private based on the privacy concern information of the privacy firewall, wherein learning privacy concern information of the user comprises analyzing user cultural or social context associated with the user, determining a user personality type, and measuring user historical speaking tone of the user, and determining a privacy type or level of privacy associated with the user based on the learned privacy concern information, wherein applying the privacy firewall comprises filtering and disregarding storing of captured audio samples that correspond to the determined privacy type or level of privacy.

12. The computer program product of claim 11, wherein analyzing the one or more captured audio samples comprises performing a joint analysis of a plurality of different characteristics of the one or more captured audio samples and matching results of the joint analysis to criteria specified in a plurality of stored sound models in a sound model repository storage associated with the smart speaker device.

13. The computer program product of claim 11, wherein analyzing the one or more captured audio samples to determine whether the one or more captured audio samples represent a potential wake sound for initiating a responsive action by the smart speaker device further comprises:
   transmitting the one or more captured audio samples to a remote smart speaker system service of a remotely located server computing device;
   comparing, by the smart speaker system service, sound patterns of the one or more captured audio samples to stored sound patterns associated with a plurality of sound models in a sound model repository associated with the smart speaker system service; and
   in response to identifying at least one stored sound pattern of at least one sound model that matches one or more of the sound patterns of the one or more captured audio samples, returning sound type and sound source type information from the at least one sound model corresponding to the at least one stored sound pattern.

14. The computer program product of claim 13, wherein determining whether the one or more captured audio samples represent a potential wake sound for initiating a responsive action by the smart speaker device, further comprises:
   applying, by at least one of the smart speaker device or the smart speaker system service, one or more event rules to the sound type and sound source type information from the at least one sound model corresponding to the at least one stored sound pattern;
   determining, by at least one of the smart speaker device or the smart speaker system service, whether application of the one or more event rules indicates that an event has occurred in the monitored environment; and
   initiating, by at least one of the smart speaker device or the smart speaker system service, performance of the responsive action by the smart speaker device, in response to determining that the event has occurred in the monitored event, wherein the responsive action is specified by the one or more event rules.

15. The computer program product of claim 11, wherein analyzing the one or more captured audio samples to determine whether the one or more captured audio samples represent a potential wake sound for initiating a responsive action by the smart speaker device, comprises:
   determining at least one of location or movement information, in the monitored environment, of one or more sources of the one or more captured audio samples; and
   cognitively classifying the one or more captured audio samples based on the determined at least one of location or movement information of the one or more sources of the captured audio samples.

16. The computer program product of claim 11, wherein determining whether the one or more captured audio samples represent a potential wake sound for initiating a responsive action by the smart speaker device comprises applying user specified configuration information to classification of the one or more captured audio samples, wherein the user specified configuration information specifies user specific types of sounds for which responsive actions are to be performed.

17. The computer program product of claim 11, wherein the responsive action is at least one of outputting of an audible message, outputting of an audible request or question to a user and listening for an audible response from a user which is then processed by the smart speaker device, triggering of a display of information on a display associated with the smart speaker device, triggering of a visual indicator on the smart speaker device, controlling an operation of another device to perform an operation within the monitored environment, or initiating a communication to another device via a wired or wireless connection.

18. The computer program product of claim 17, wherein the responsive action is initiating the communication to another device via a wired or wireless connection, and wherein the communication comprises an indication of an identified event that has occurred in the monitored environment, and a recording of the one or more captured audio samples corresponding to the event for playback by a device receiving the communication.

19. The computer program product of claim 11, wherein determining whether the one or more captured audio samples represent a potential wake sound for initiating a responsive action by the smart speaker device comprises:
   learning ambient sound patterns present in the monitored environment at various times of a day; and
   determining whether or not a sound pattern in the one or more captured audio samples is different, by at least a threshold amount, from the ambient sound patterns learned to be present in the monitored environment at the time of day that the one or more captured audio samples were captured by the audio capture device.

20. A smart speaker device comprising:
a processor;
a memory coupled to the processor;
an audio capture device coupled to the processor and the memory; and
an audio sample buffer coupled to the audio capture device, wherein the memory comprises instructions which, when executed by the processor, cause the processor to:
capture, via the audio capture device, one or more audio samples from a monitored environment;
store the captured one or more audio samples in the audio sample buffer, wherein the audio sample buffer stores an amount of captured audio samples corresponding to a specified time window for detecting events occurring within the monitored environment;
analyze the one or more captured audio samples to determine whether the one or more captured audio samples represent a potential wake sound for initiating a responsive action by the smart speaker device, wherein the potential wake sound is a variable sound determined to not be a normal ambient sound of the monitored environment; and
in response to determining that the one or more captured audio samples represent a potential wake sound for initiating a responsive action by the smart speaker device, initiate performance of the responsive action by the smart speaker device, wherein determining whether the one or more captured audio samples represent a potential wake sound for initiating a responsive action by the smart speaker device, further comprises:
learning privacy concern information of a user associated with the monitored environment; and
applying a privacy firewall based on the privacy concern information of the user to the one or more captured audio samples to filter and disregard storing of captured audio samples in the audio sample buffer that are determined to be private based on the privacy concern information of the privacy firewall, wherein learning privacy concern information of the user comprises analyzing user cultural or social context associated with the user, determining a user personality type, and measuring user historical speaking tone of the user, and determining a privacy type or level of privacy associated with the user based on the learned privacy concern information, wherein applying the privacy firewall comprises filtering and disregarding storing of captured audio samples that correspond to the determined privacy type or level of privacy.

\* \* \* \* \*